United States Patent
Chung

(10) Patent No.: US 11,491,769 B2
(45) Date of Patent: Nov. 8, 2022

(54) IMPACT-RESISTANT LIGHTWEIGHT POLYMERIC LAMINATES

(71) Applicant: Frontier Performance Polymers Corporation, Parsippany, NJ (US)

(72) Inventor: Sengshiu Chung, Parsippany, NJ (US)

(73) Assignee: FRONTIER PERFORMANCE POLYMERS CORPORATION, Parsippany, NJ (US)

( * ) Notice: Subject to any disclaimer, the term of this patent is extended or adjusted under 35 U.S.C. 154(b) by 412 days.

(21) Appl. No.: 15/952,710

(22) Filed: Apr. 13, 2018

(65) Prior Publication Data

US 2018/0229480 A1     Aug. 16, 2018

Related U.S. Application Data

(63) Continuation-in-part of application No. 11/870,126, filed on Oct. 10, 2007, now abandoned.

(Continued)

(51) Int. Cl.
*B32B 27/08* (2006.01)
*C09J 175/04* (2006.01)
(Continued)

(52) U.S. Cl.
CPC .......... *B32B 27/08* (2013.01); *B29C 48/0018* (2019.02); *B29C 48/0021* (2019.02);
(Continued)

(58) Field of Classification Search
CPC ......... B32B 27/08; B32B 27/32; B32B 27/36; B32B 37/04; B32B 38/1816;
(Continued)

(56) References Cited

U.S. PATENT DOCUMENTS 3,207,736 A  9/1965  Wijga
3,214,503 A  10/1965  Benz et al.
(Continued)

FOREIGN PATENT DOCUMENTS

DE   3716004 A1    11/1988
WO   199520776 A1   8/1995
WO   03/101729 A2  12/2003

OTHER PUBLICATIONS

Mitsubishi Polymer Film, Inc., 4507 Solvent Adherable Film Product Bulletin (2016).*

(Continued)

*Primary Examiner* — Kregg T Brooks
(74) *Attorney, Agent, or Firm* — Fox Rothschild LLP

(57) ABSTRACT

Bonded polymeric film laminates comprising core polymer film layers individually coated on at least one side with a heat fusible polymer layer and fusion bonded together by the application of heat and pressure at a temperature at which each heat fusible polymer coating bonds together adjacent core polymer film layers, where the melting point or softening temperature of the heat fusible polymer is at least 3° C. below that of the core layer polymer, and the lamination temperature is at or above the melting point or softening temperature of the heat fusible coating polymer, where the heat fusible polymer coating layers are thinner than the core polymer film layers, where the coated core polymer film layers are uniaxially stretched by 2× to 40×, and the stretched coated core polymer film layers are cross-plied. Methods for forming the laminates, coated films from which the laminates are formed, and articles formed from the laminates are also disclosed.

21 Claims, 19 Drawing Sheets

Related U.S. Application Data

(60) Provisional application No. 60/850,723, filed on Oct. 11, 2006.

(51) Int. Cl.

| | |
|---|---|
| *C08J 5/12* | (2006.01) |
| *B32B 27/32* | (2006.01) |
| *B32B 27/36* | (2006.01) |
| *B32B 37/15* | (2006.01) |
| *F41H 5/04* | (2006.01) |
| *C09J 5/06* | (2006.01) |
| *B29L 7/00* | (2006.01) |
| *B29L 9/00* | (2006.01) |
| *B32B 37/04* | (2006.01) |
| *B29C 48/08* | (2019.01) |
| *B29C 48/00* | (2019.01) |
| *B29C 48/21* | (2019.01) |
| *B29C 48/154* | (2019.01) |
| *B30B 15/06* | (2006.01) |
| *B32B 38/18* | (2006.01) |

(52) U.S. Cl.
CPC ............ *B29C 48/022* (2019.02); *B29C 48/08* (2019.02); *B29C 48/154* (2019.02); *B29C 48/21* (2019.02); *B30B 15/064* (2013.01); *B32B 27/32* (2013.01); *B32B 27/36* (2013.01); *B32B 37/153* (2013.01); *B32B 38/1816* (2013.01); *C08J 5/121* (2013.01); *C08J 5/128* (2013.01); *C09J 5/06* (2013.01); *C09J 175/04* (2013.01); *F41H 5/0407* (2013.01); *B29K 2995/0026* (2013.01); *B29L 2007/008* (2013.01); *B29L 2009/00* (2013.01); *B32B 37/04* (2013.01); *B32B 2255/10* (2013.01); *B32B 2255/26* (2013.01); *B32B 2307/412* (2013.01); *B32B 2307/516* (2013.01); *B32B 2323/04* (2013.01); *B32B 2323/10* (2013.01); *B32B 2367/00* (2013.01); *B32B 2571/02* (2013.01); *B32B 2605/00* (2013.01); *C08J 2369/00* (2013.01); *C08J 2467/02* (2013.01); *C08J 2475/04* (2013.01); *C09J 2475/00* (2013.01); *F41H 5/0428* (2013.01); *F41H 5/0457* (2013.01); *F41H 5/0478* (2013.01)

(58) Field of Classification Search
CPC ............ B32B 2255/26; B32B 2323/10; B32B 2367/00; B32B 2571/02; F41H 5/0407
See application file for complete search history.

(56) References Cited

U.S. PATENT DOCUMENTS

| | | |
|---|---|---|
| 4,079,161 A | 3/1978 | Kile |
| 4,081,581 A | 3/1978 | Littell, Jr. |
| 4,121,014 A | 10/1978 | Shaffer |
| 4,309,487 A * | 1/1982 | Holmes .................. B32B 27/32 |
| | | 428/516 |
| 4,384,016 A | 5/1983 | Ide et al. |
| 4,540,623 A | 9/1985 | Im et al. |
| RE32,406 E | 4/1987 | Molari, Jr. |
| 4,748,072 A | 5/1988 | Schobermayr |
| 5,283,017 A | 2/1994 | Rohleder et al. |
| 5,846,620 A | 12/1998 | Compton |
| 5,956,175 A | 9/1999 | Hojnowski |
| 6,387,477 B1 | 5/2002 | Ogura et al. |
| 2001/0023016 A1 | 9/2001 | Benz et al. |
| 2009/0068453 A1* | 3/2009 | Chung ..................... F41H 5/04 |
| | | 428/337 |
| 2015/0251392 A1* | 9/2015 | Dorschu ................ B32B 27/36 |
| | | 89/36.02 |

OTHER PUBLICATIONS

Cruz et al., "Mechanical properties and structure of glassy and semicrystalline random copolymers of poly(ethylene terephthalate) and poly(ethylenenaphthalene-2,6-dicarboxilate)," Journal of Materials Science (1992): vol. 27, pp. 2161-2164.

Okamoto et al., "Study on the thermal behavior of a solution-cast liquid-crystalline polymer film by positron-annihilation lifetime spectroscopy," Polymer (2005): vol. 46, pp. 6455-6460.

Hu et al., "Solid state structure and oxygen transport properties of copolyesters based ons mectic poly(hexamethylene 4,4'-bibenzoate), " Polymer (2006): vol. 47, pp. 2423-2433.

Okamoto et al., "Newly Developed LCP film fabricated by solvent-casting method," This paper is translated from R&D Report, "sumitomo Kagaku", vol. 2005-1, pp. 1-11 (Technical Paper).

James M. Margolis, "Enginnering Plastics Handbook" McGraw-Hill Handbooks, Margolis Polymers (Montreal, Province of Quebec, Canada) Copyright 2006 McGraw-Hill Companies, Inc.

Polycarbonate literature downloaded on Dec. 6, 2011 from http://www.gallinausa.com/polycarbonate.tech.html.

Polyvinyl Butryal sheet downloaded on Dec. 6, 2011 from http://www.chemblink.com/products/63148-65-2.htm.

Jackson et al., "Liquid Crystal Polymers. I. Preparation and Properties of p- Hydroxybenzoic Acid Copolyesters," Journal of Polymer Science, vol. 14, pp. 2043-2058.

\* cited by examiner

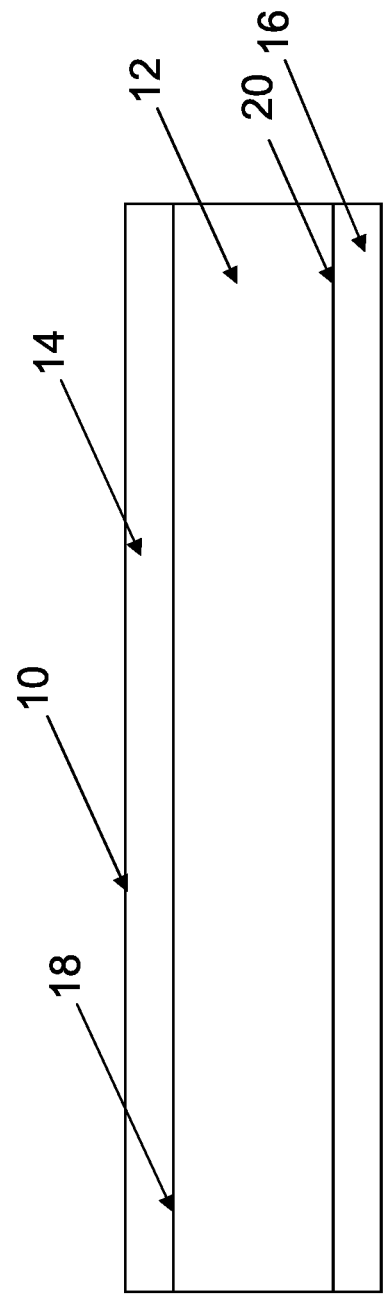

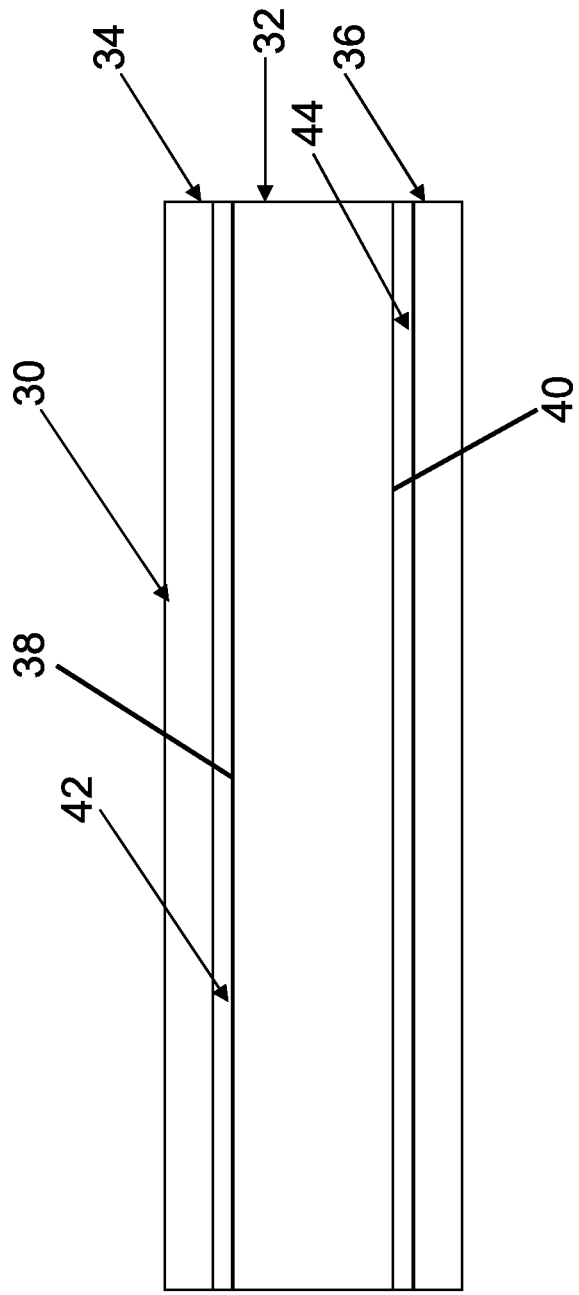

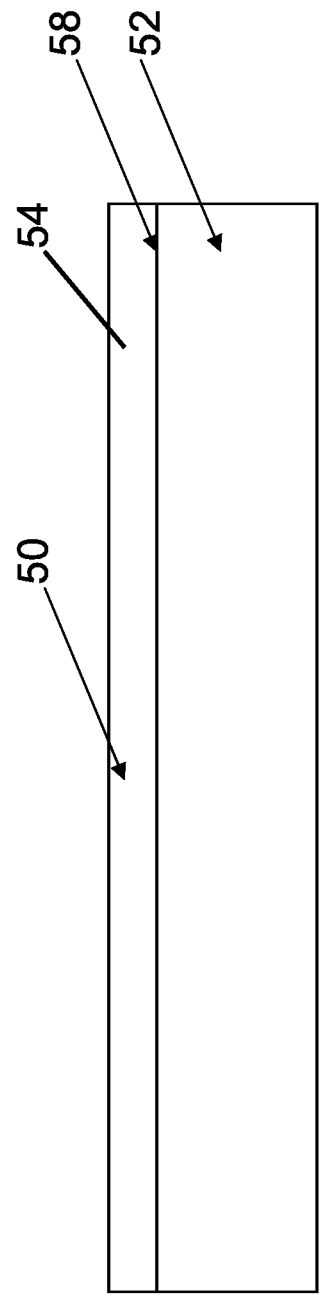

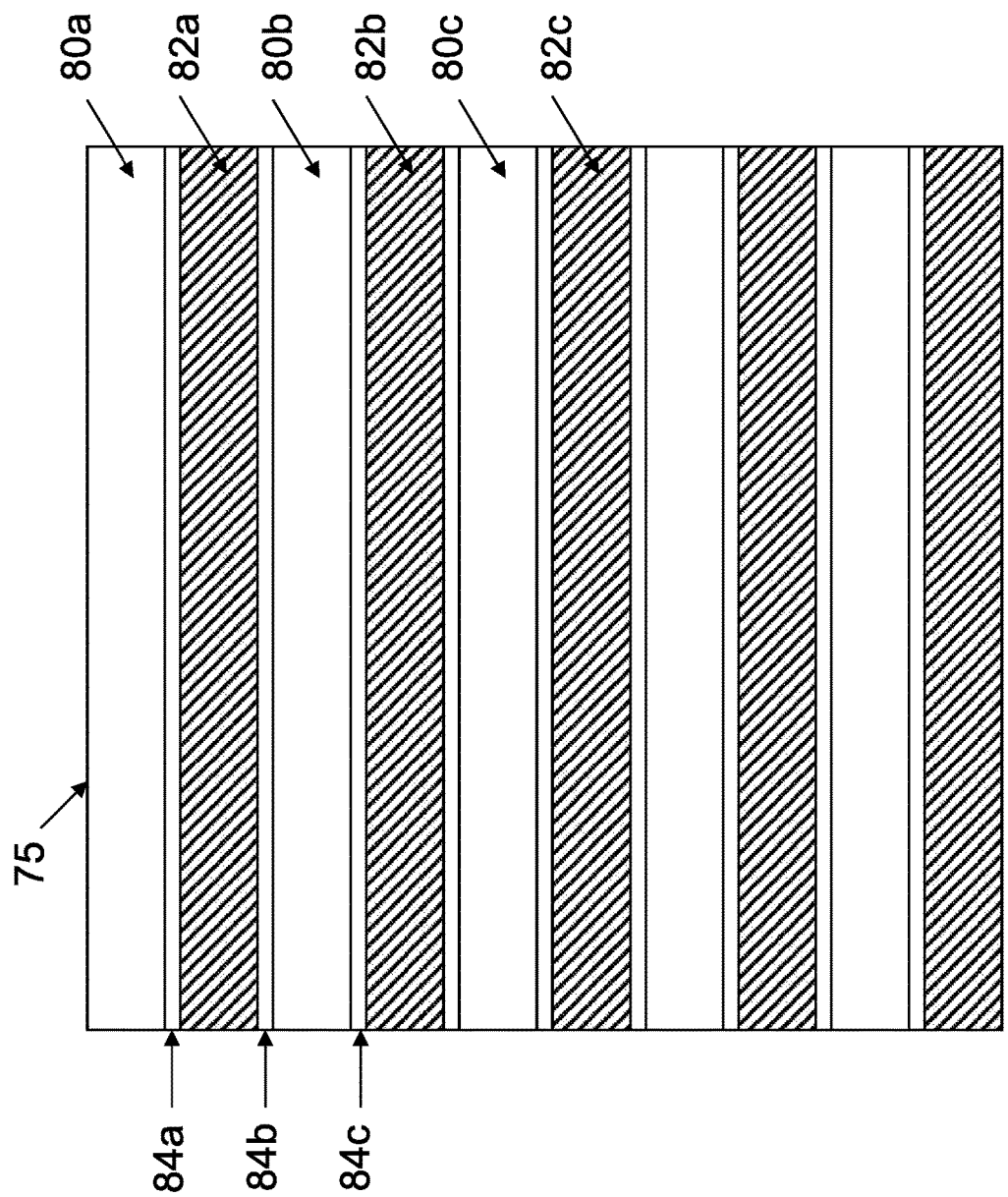

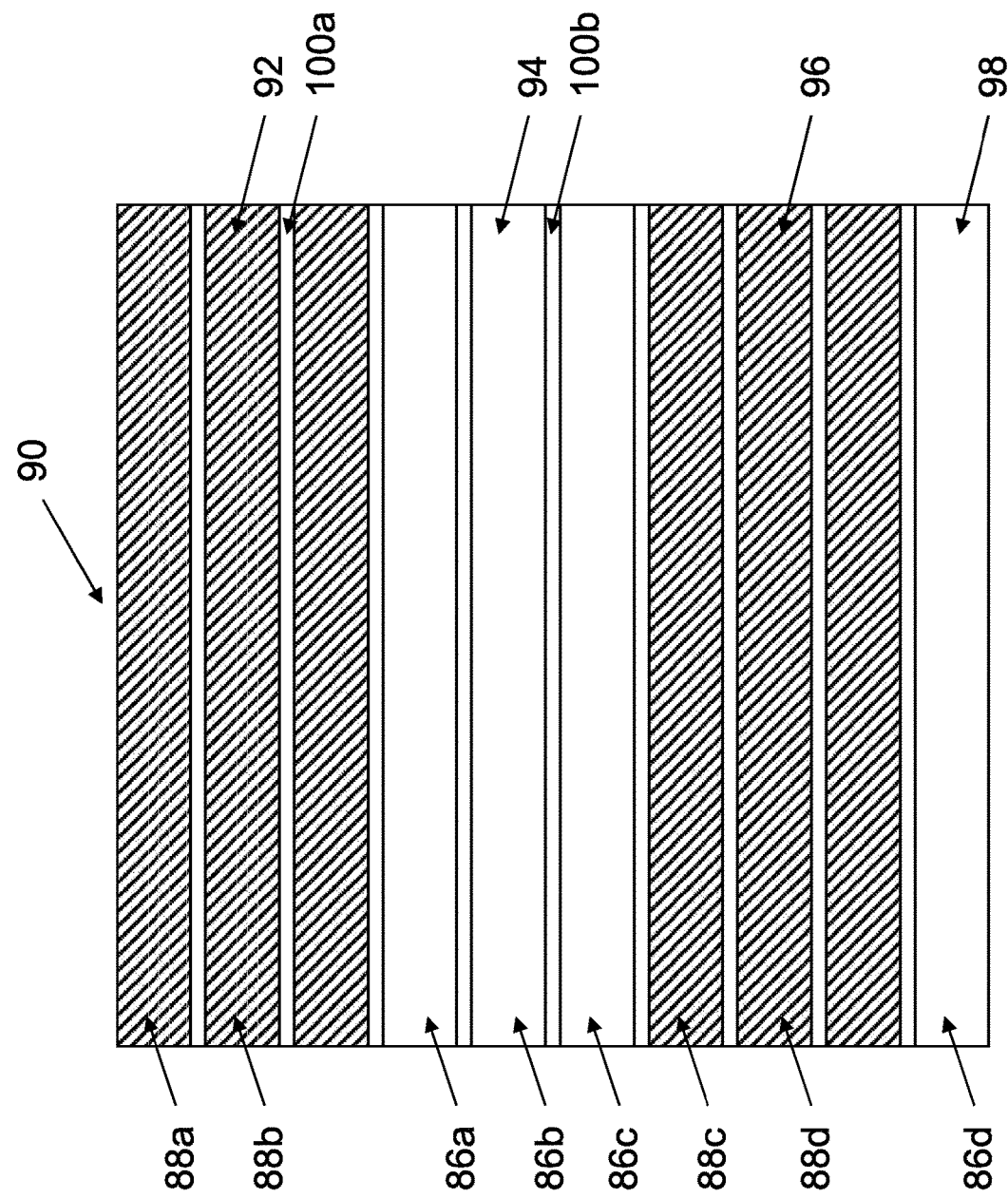

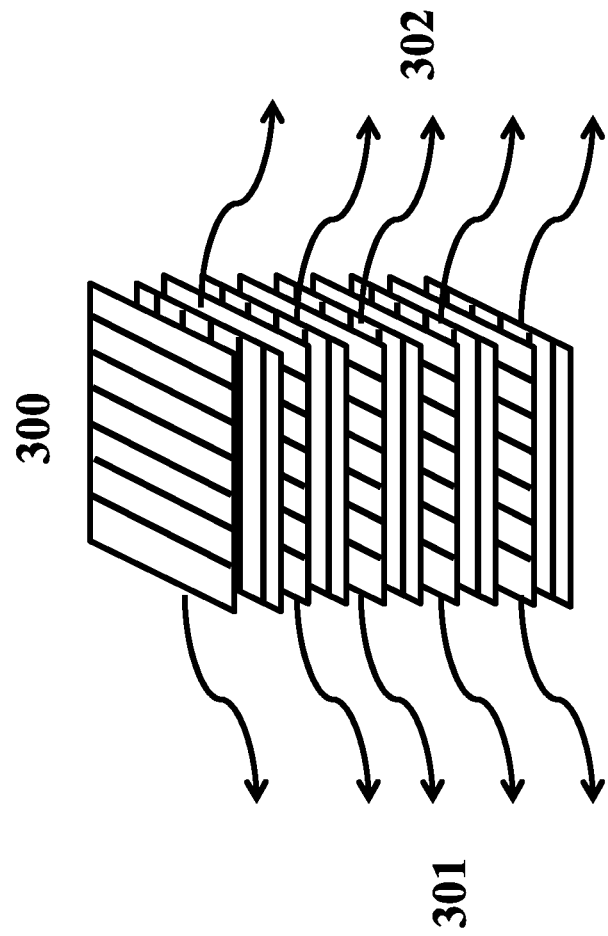

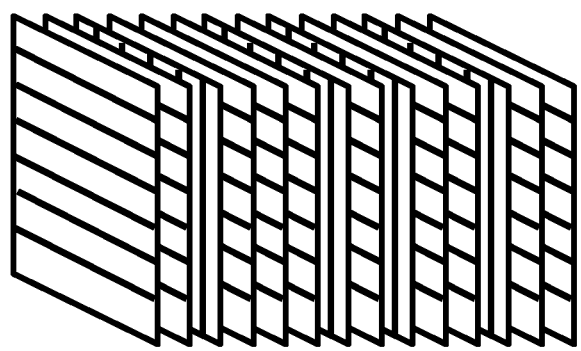
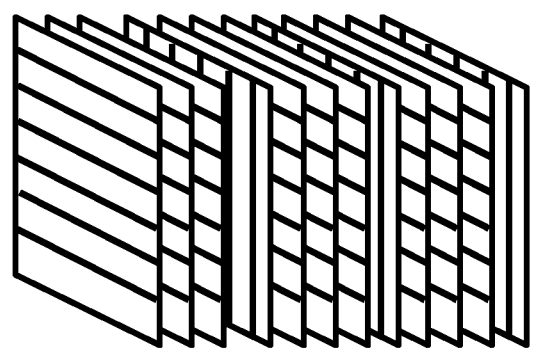
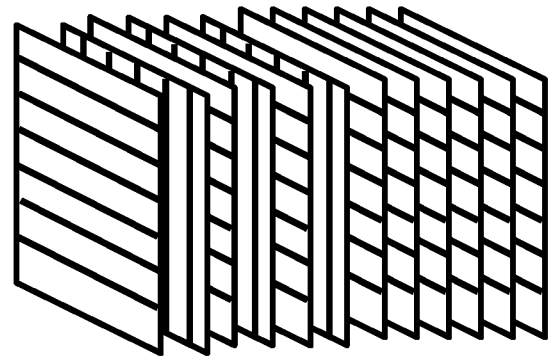
Fig. 3B

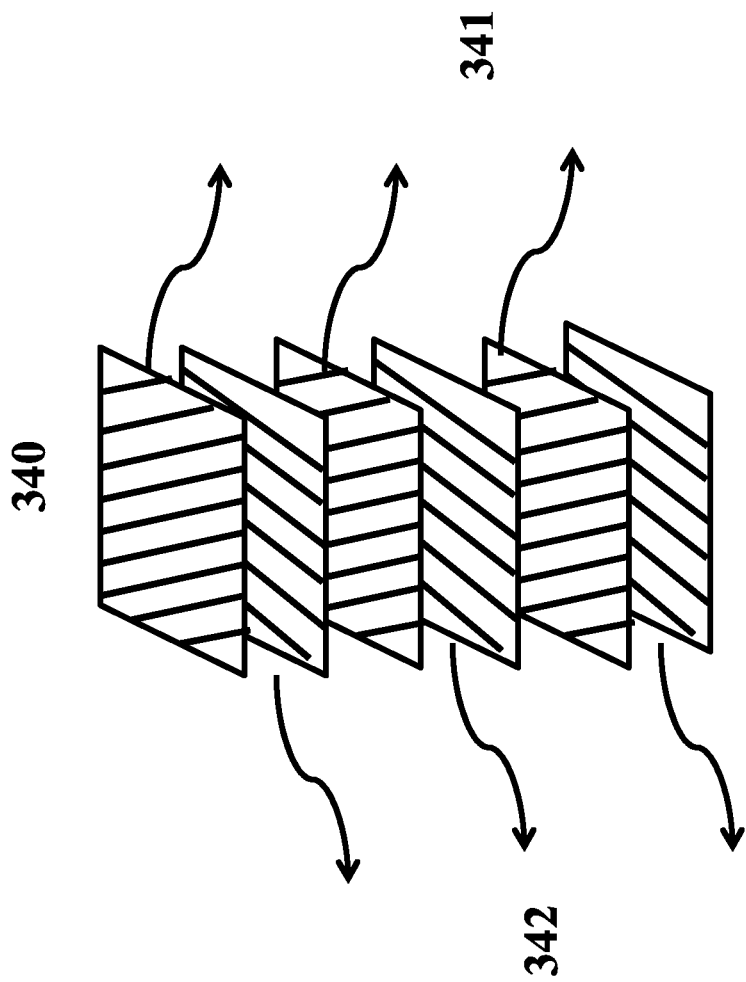

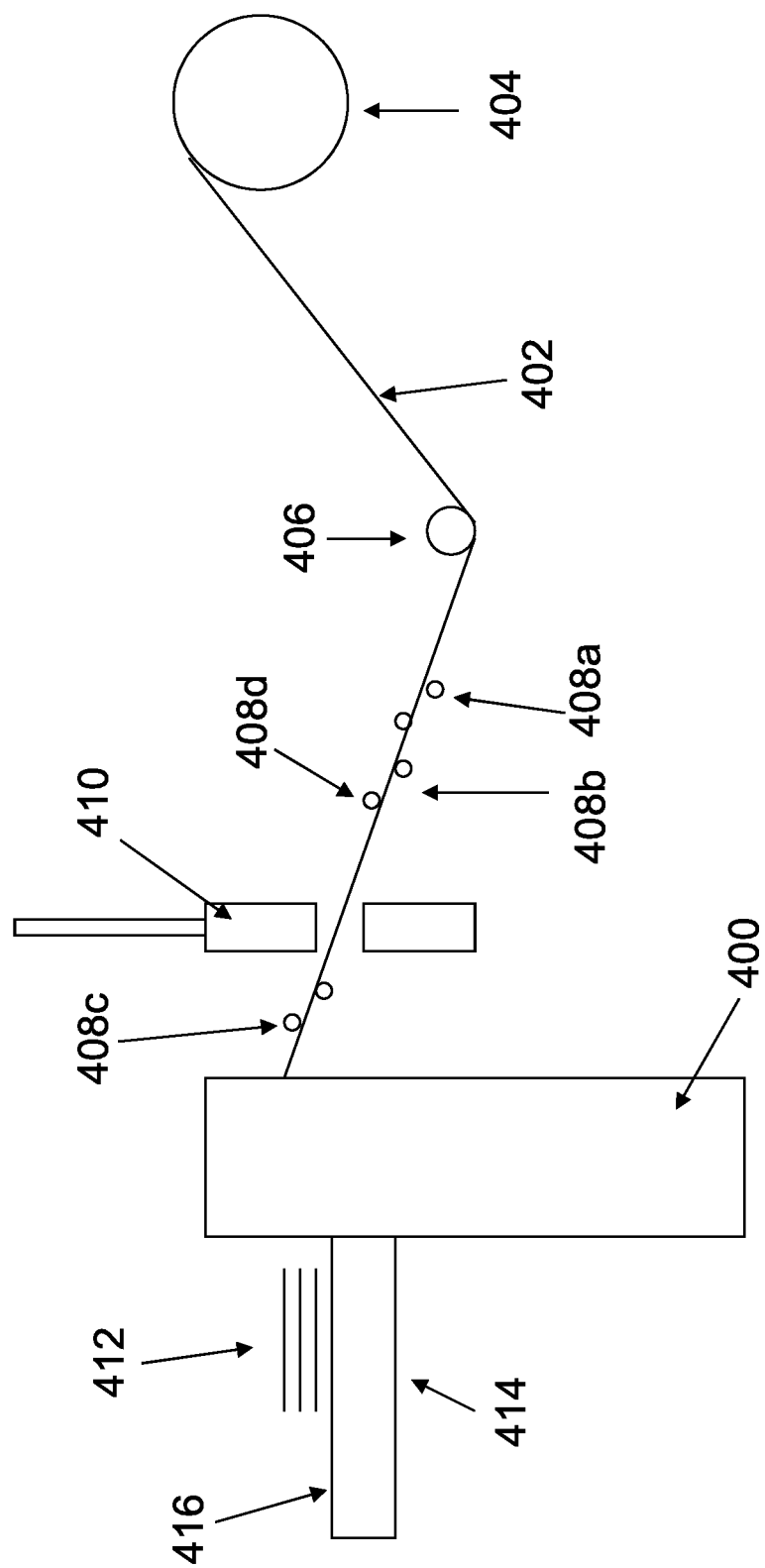

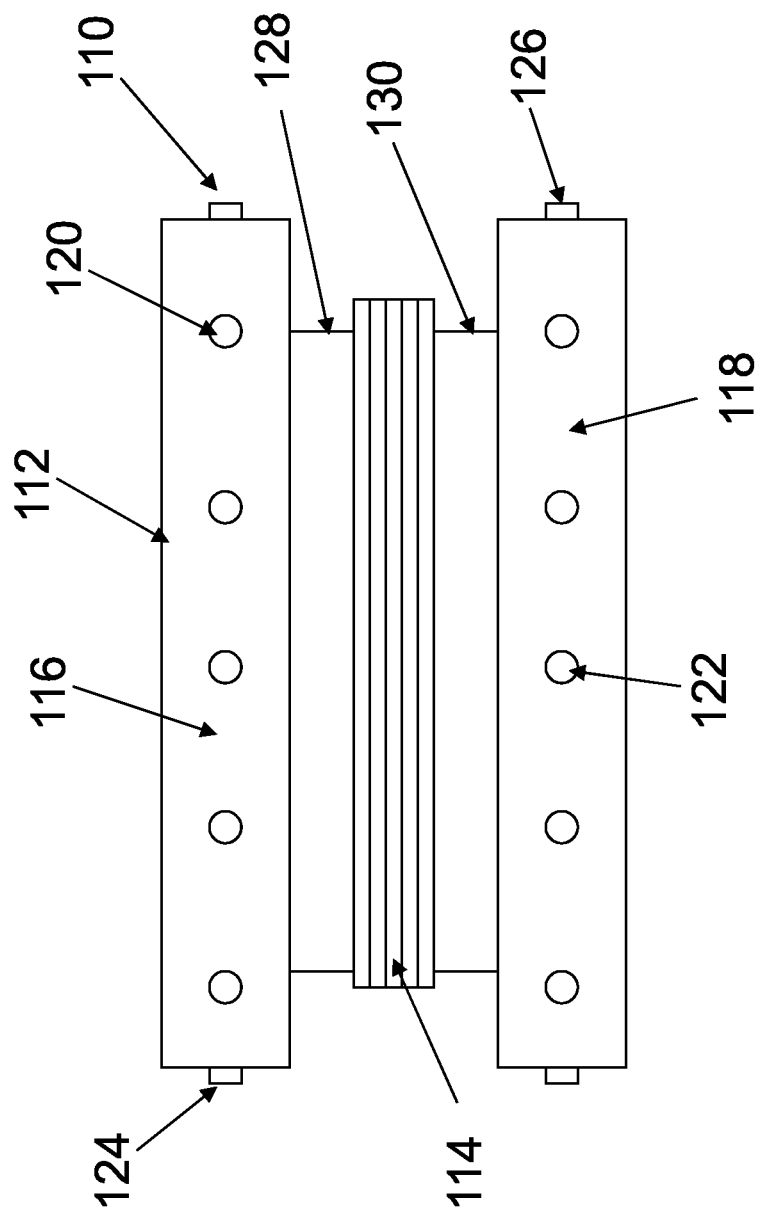

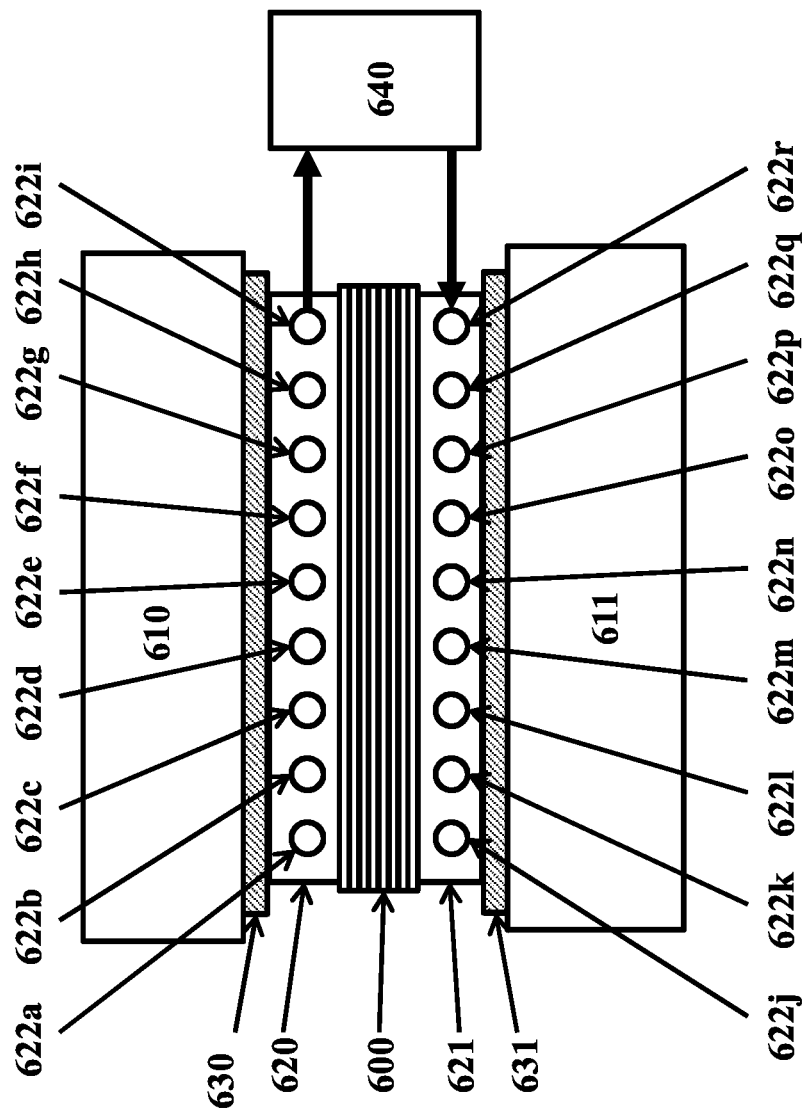

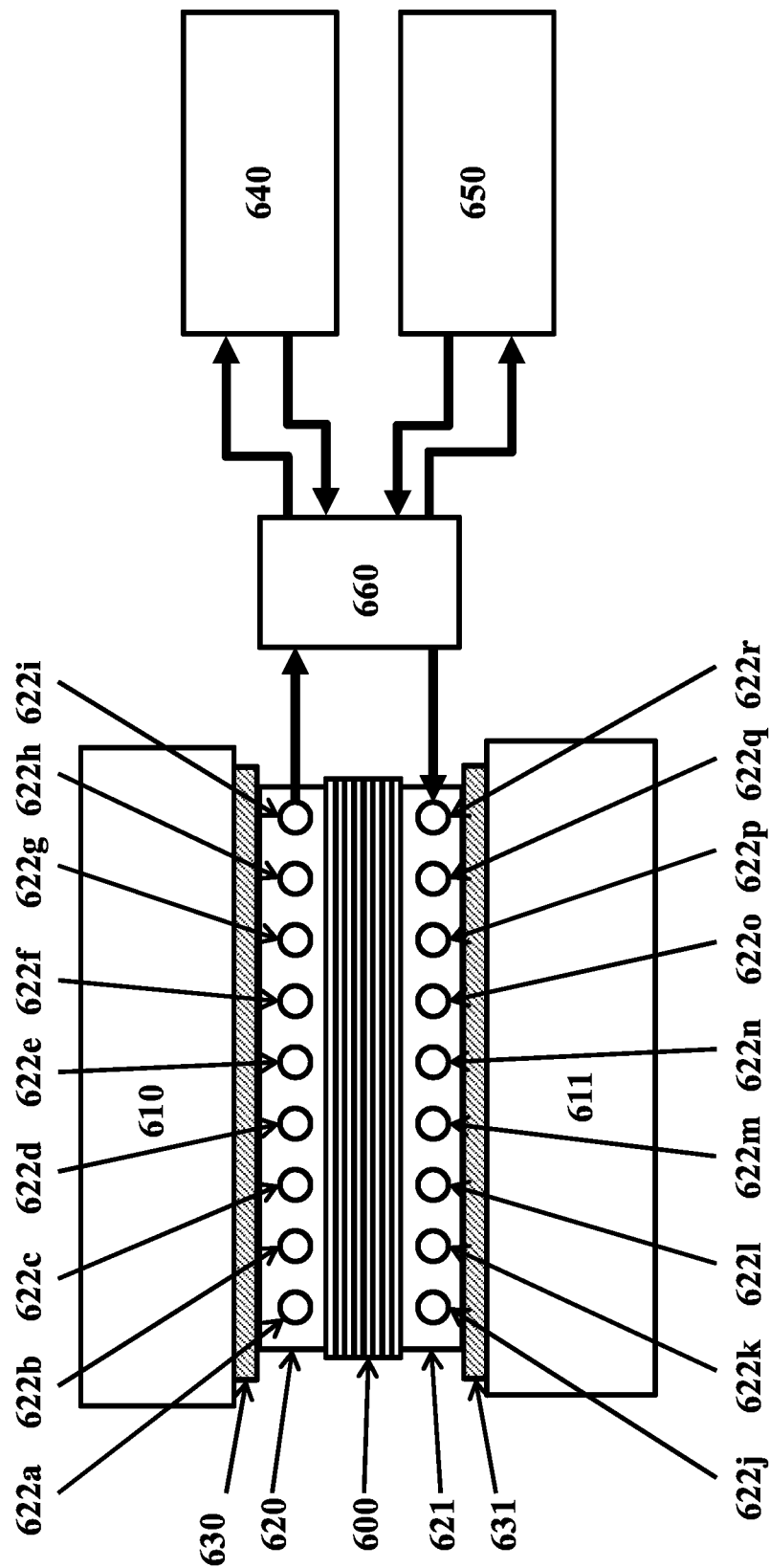

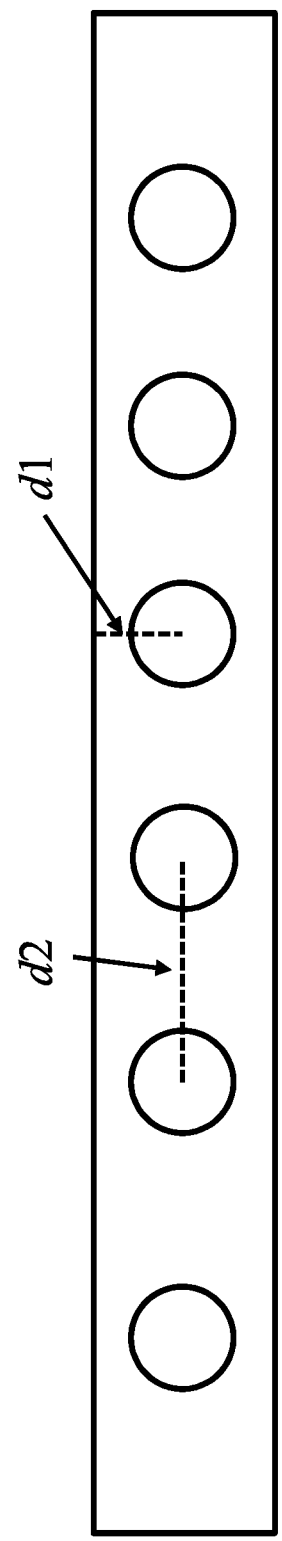

FIG 9
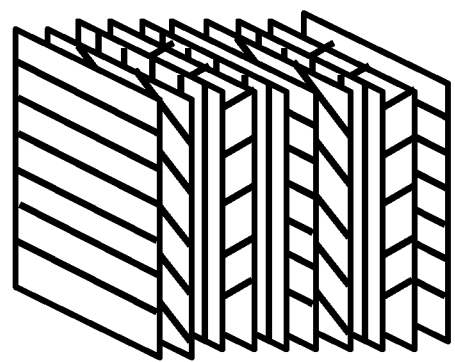
0/45/90/-45/0
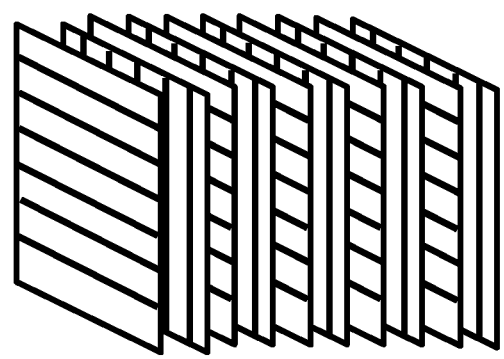
0/90

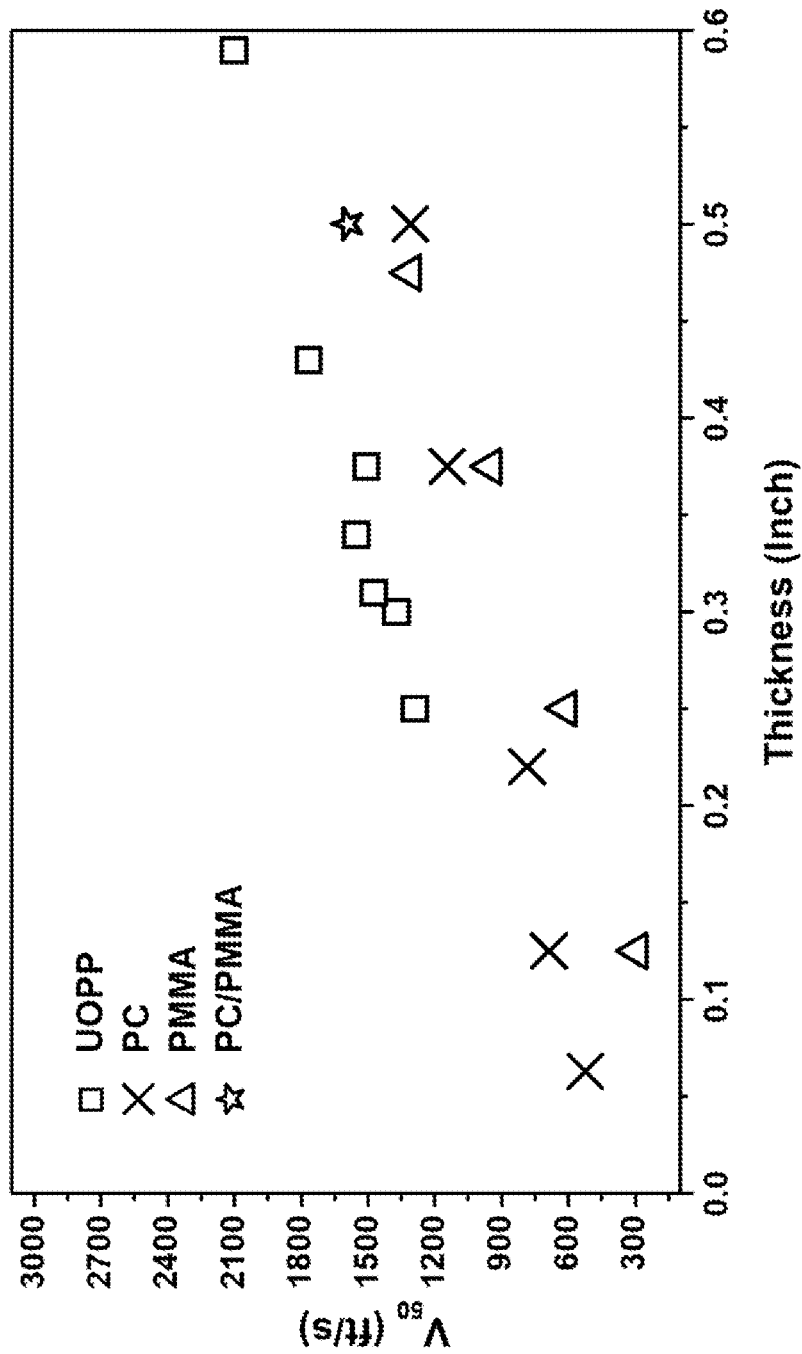

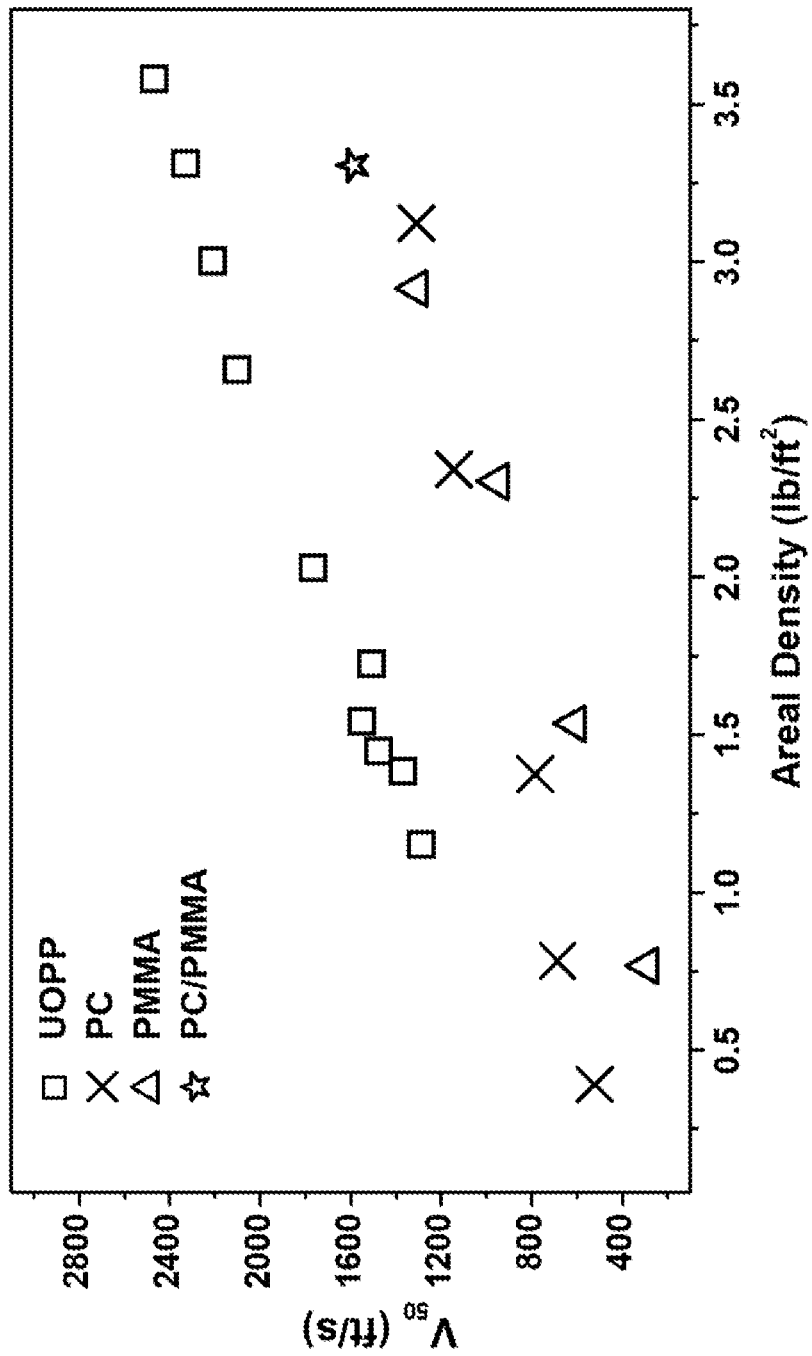

IMPACT-RESISTANT LIGHTWEIGHT POLYMERIC LAMINATES

CROSS-REFERENCE TO RELATED APPLICATIONS

This application is a continuation-in-part under 35 U.S.C. § 120 of U.S. application Ser. No. 11/870,126, filed on Oct. 10, 2007, which claims the benefit of priority under 35 U.S.C. § 119(e) of U.S. Provisional Patent Application No. 60/850,723, filed on Oct. 11, 2006, the disclosures of both of which are incorporated herein by reference in their entireties.

STATEMENT OF GOVERNMENT LICENSE RIGHTS

The U.S. Government has a paid-up license to this invention and the right in limited circumstances to require the patent owner to license others on reasonable terms as required by the terms of Phase I SBIR Contract No. W911QY-07-C-0017 awarded by the U.S. Department of Defense.

BACKGROUND

The present invention relates to impact-resistant lightweight polymeric laminates. In particular, the present invention relates to impact-resistant light-weight rigid laminated polymeric articles for use in military applications, as well as for use in the construction and automotive industries.

The present invention also relates to impact-resistant lightweight polymeric laminates for ballistic protection such as various types of armor, including body armor. The polymeric laminates of the present invention substantially increase the level of ballistic protection available to military and law enforcement personnel without increasing equipment weight.

The present invention further relates to light-weight transparent materials for ballistic protection, including materials for eye and face protection, having ballistic impact resistance properties comparable to present non-transparent fiber reinforced polymer composite materials. At the same time the light-weight impact-resistant transparent materials of the present invention have optical properties comparable to commercially available transparent polymers presently used for eye and face protection, and also achieve up to 30% weight savings.

Polycarbonates (PC) and polymethylmethacrylates (PMMA) are lightweight trans-parent polymers that have been used for decades as transparent impact-resistant structural and semi-structural materials. However, there is a substantial performance gap in the impact resistance of monolithic transparent polymers, such as polycarbonates, versus that of ultra-high strength fiber reinforced polymer composites. Because of the very high tensile strength of the fiber, the impact resistance (on a weight basis) of the fiber reinforced composites is typically much greater than that of monolithic polymers.

However, such fiber reinforced composite materials cannot be used for transparent applications because they lack optical transparency. As a result, in military, law enforcement and construction applications, the level of eye and face protection is considerably less than that provided by the helmet used to cover the rest of the head. New lightweight materials are needed to provide adequate eye and face protection for soldiers, construction workers and law enforcement personnel.

Over the years there have been numerous developmental efforts to optimize the ballistic impact resistance of lightweight polymeric ballistic protection systems. The state of the art in lightweight transparent armor for use in law enforcement and the military has been unchanged for many years because of the lack of higher-performance transparent component materials such as transparent ceramics, glass/ceramics, glass and plastics. For example, no new plastic has been commercialized for use in the volume manufacture of transparent protection for the face and eyes since polycarbonate was introduced into the market in 1958.

The performance of transparent impact-resistant materials has historically lagged behind that of opaque materials, when judged by the material's mass-efficiency parameter. In military uses, the most efficient designs of transparent armor intended to defeat fragmentation from explosive ordnance have traditionally been monolithic or laminated plastic(s). Glass, because of its high density, is historically not competitive in defeating the irregularly shaped, and less-penetrating, fragment threats. The highest-performing transparent protection designed to defeat small-arms projectiles to date consists of a laminated glass/plastic composite.

Table 1 summarizes the advantages and disadvantages of three current transparent technologies: glass laminates, plastic laminates and plastic-glass composite laminates. Transparent plastic laminates have the advantage of being lightweight and retaining resident visibility after ballistic impact, but have as a major disadvantage being much lower in ballistic impact resistance.

TABLE 1

Summary of current transparent materials

| | Advantages | Disadvantages |
|---|---|---|
| Glass Laminates | Common technology<br>Readily available<br>Relatively inexpensive | Thick and heavy<br>Glass spalling<br>Poor resident visibility |
| Plastic Laminates | Very lightweight<br>Excellent impact resistance<br>Good spall ply material<br>Has good resident visibility after ballistic impact | Poor weatherability<br>Poor abrasion/chemical resistance<br>Relatively low ballistic resistance<br>Relative expensive |
| Plastic-Glass Composite Laminates | 50% lighter and thinner than glass laminates<br>Good thermal efficiency and weatherability<br>Highest ballistic resistance capability<br>Significant design latitude | Service life sensitive to design and fabrication process<br>Spall ply abrasion/chemical resistance<br>Poor resident visibility |

However, even using a current lightweight plastic laminate, the weight of transparent armor is still too heavy when a thick laminate is required to provide sufficient protection. For example, per the current Explosive Ordnance Disposal (EOD) face shield assembly, the total assembly weight is 12.4 lbs, where the face shield itself weighs 4 lbs. This heavy weight imposes a substantial physical burden on soldiers. Therefore, it is necessary to continuously reduce the weight of transparent armor material. One major advantage of polypropylene material over the traditional transparent material (PC and PMMA) is the remarkable weight saving. The density of PC and PMMA is about 1.2 g/cm$^3$, while the density of polypropylene is only 0.9 g/cm$^3$. The transparent articles fabricated using polypropylene can achieve up to 30% weight savings compared to PC or PMMA of the same thickness.

In the late 1970's and early 1980's, lighter impact-resistant transparent materials were developed by laminating stretched polypropylene films together through fusion bonding. It was found that the ballistic impact resistance of laminated film was higher than that of monolithic polycarbonate at the same thickness, and also the PP laminates are 30% lighter than PC plates at the same thickness. In fusion bonding, a stack of cross-plied, stretched films is heated to close to its melting temperature. Once the surface of each film within a stack is partially melted or softened, the films are then bonded together under a static pressure. However, this fusion bonded laminated film technology encountered several major technical hurdles to commercial feasibility. These technical hurdles include at least the following:

Long cycle time and labor intensive

Visual defects such as milky appearance, whitening, striations, and opaqueness

Non-bonding or delaminating of plies

Optical properties are considerably worse than polycarbonate.

In the early 1990's, roll-to-roll technology was developed to laminate polypropylene films with heat fusible layers through fusion bonding. The core layer polymer films were coated with heat fusible layers at both sides to bond with unstretched polymer films to ensure the bonding. This configuration would weaken the impact and ballistic resistance because considerable portions of the laminates are composed of unstretched films. Due to the film winding orientation, this roll-to-roll technology is not able to fabricate cross-plied laminates. Moreover, the roll-to-roll process cannot produce thick laminates because it is impossible to bend a thick laminate that has a low thermal conductivity in a fast and continuous process.

Hence, there remains an urgent need for an innovative transparent high performance lightweight polymeric material that has ballistic impact resistance protection efficiency comparable to fiber reinforced polymer matrix composite materials. In particular there is a need for transparent impact resistant materials with optical properties comparable to commercial plastic and/or glass transparent impact-resistant materials.

SUMMARY OF THE INVENTION

This need is met by the present invention. It has now been discovered that axially stretched polymer films can be laminated together by interfacial heat sealable films layered there-between to form film laminates with improved impact resistance versus monolithic polymer sheets of the same thickness. The layers form an integral article under heat and pressure, possessing the tensile strength required for impact resistance from high speed projectiles. Moreover, the inventive method of forming the film laminates can significantly improve the optical properties, such as lower haze, and/or higher transmittance and/or higher clarity, when compared to prior art film laminates.

The laminates of the present invention are composed of a plurality of axially stretched films. It is well known that axially stretched films have significantly higher tensile strength in the stretched direction versus unstretched films. Therefore, the laminates that are composed of a plurality of axially stretched films have higher tensile strength than comparable extruded or injection molded sheets. As used herein the term "plurality" means more than 2, and typically about 3 to about 4000. In some embodiments the laminates contain about 10 to about 4000, or about 20 to about 4000, or about 50 to about 4000, or about 75 to about 4000, or about 100 to about 4000, or about 150 to about 4000, or about 200 to about 4000, or about 250 to about 4000, or about 300 to about 4000, or about 400 to about 4000, or about 500 to about 4000, or about 750 to about 4000, or about 1000 to about 4000 core polymer film layers.

The laminates of the present invention take advantage of polymer fracture mechanics through use of mechanically isolated laminate layers that maximize energy absorption by containment of the deformation of each film layer. It is known that the fracture mechanism of a polymer solid will undergo a change from plane stress to plane strain as its thickness increases. For example, when the thickness of a PC plate exceeds 0.5 inch, the ductile PC shows brittle failure upon the ballistic impact. In general, plane stress deformation is a ductile behavior and plane strain deformation is a brittle phenomenon. Prior art laminated film technology used fusion heating to bond stretched polypropylene films to form a solid block. Thus, even when the uniaxially stretched films in the laminate are cross-plied, its fracture mechanism became dominated by plane strain as the thickness of the film laminates increased.

The laminates of the present invention are composed of core polymer film layers on at least one surface with heat fusible polymer layers, with which adjacent core layers are fusion bonded, thereby forming a bonded laminate in which each core film layer undergoes individual plane stress deformation rather than the plane strain deformation exhibited by monolithic polymer layers of equivalent thickness and by prior art film laminates. The laminates of the present invention exhibit plane stress deformation at thicknesses at which prior art laminates may exhibit plane strain deformation, which also prevents crack propagation from exceeding its critical stage. Consequently, the ballistic impact resistance of the film laminates of the present invention exceeds that of prior art film laminates. Moreover, compared to PC material, the laminates of the present invention eliminate the thickness-induced ductile-to-brittle transition, and maintain the non-brittle failure behavior at all thicknesses in the range from 0.2 to 10 cm.

According to one aspect of the present invention, the coated heat fusible layer can lower the lamination temperature, therefore, both optical properties and ballistic resistance of the inventive film laminates can be considerably improved versus prior art film laminates. The lower lamination temperature can decrease the possibility of polymer recrystallization thereby reducing the haze and also preventing the laminates from yellowing at higher temperature. The axially stretched films are in a meta-stable state and they will release the internal stress through stress relaxation at high lamination temperatures. In another words, the axially stretched films can lose their strength due to high-temperature induced shrinkage. Therefore, a lower lamination temperature is desired to maintain the high strength of axially stretched films.

Thus, according to one aspect of the present invention, a bonded polymeric film laminate is composed of axially stretched core polymer film layers that are individually coated on at least one side with a heat fusible polymer layer, where the heat fusible coating layers are thinner than the core polymer film layers, and the melting point or softening temperature of the heat fusible coating polymer is at least 3° C. below the melting point or softening temperature of the core layer polymer. The stretched coated core polymer film layers are fusion bonded together by the application of heat and pressure at a temperature at which each heat fusible polymer coating bonds together adjacent core polymer film layers but which is at least at least 3° C. lower than the melting point or softening temperature of the core layer polymer. The lamination pressure is between about 20 and about 5000 psi, preferably between about 20 and about 3000 psi, and more preferably above about 200 psi. Most polymer melting or softening temperature data is available from the raw material datasheets; otherwise, the softening temperature is defined and measured according to ASTM D-1525, and melting temperature is measured by Differential Scanning calorimetry (DSC). The laminates of the present invention have a tensile strength greater than about 10,000 psi as measured by ASTM D-638.

The heat fusible coating layers are preferably less than one-fifth the thickness of the polymer core film layers. More preferably, the heat fusible coating layers are less than one-tenth the thickness of the polymer core film layers. The core layer polymer has a melting point or softening temperature between about 100 and about 350° C. and the heat fusible coating layer polymer has a melting or softening point temperature between about 65 and about 265° C. According to another aspect of the present invention, the heat fusible layers are coated on at least one side of the core polymer film layers, where the melting point or softening temperature of the heat fusible coating layer polymer is at least 3° C. below the melting point or softening temperature of the coated polymer. The heat fusible coating layers are thinner than the coated polymer film layers, and the coated polymer films after stretching have a tensile strength in the stretched direction greater than about 20,000 psi as measured by ASTM D-882. The tensile strength is preferably above about 30,000 psi. More preferably, the tensile strength is above about 45,000 psi. For transparent ballistic protection applications, both types of film layers are preferably transparent and preferably form a bonded laminate that is also transparent.

The core polymer film layers and heat fusible coating layer films can be non-stretched or axially stretched. Axially stretched films are preferred. Unidirectionally (uniaxially) stretched films are more preferable. Essentially any polymer capable of forming a unidirectionally or biaxially stretched film can be used. Polymers suitable for use as core polymer film layers include polypropylene (PP), PP copolymers, polyesters, such as polyethylene terephthalate (PET), polyester copolymers, such as PET copolymers, polystyrene, polyacrylates, including polymethyl-methacrylate (PMMA), PMMA copolymers, cyclic olefin copolymers (COC), polyamides, polyamide copolymers, polybutylene terephthalate (PBT), polycarbonates (PC), polyether-imides (PEI), polyethersulfones (PES), and the like, where the polymers and copolymers have melting or softening point temperatures between about 100 and about 350° C.

Preferred heat fusible coating layer polymers include ethylene vinyl acetates (EVA), ethylene acrylic acid (EAA) copolymers, ethylene-methacrylic acid (EMA) copolymers, polymeric ionomers, polyethylenes, including low density polyethylene (LDPE), very low density polyethylenes (VLDPE), ultra-low density polyethylenes (ULDPE), polyethylene copolymerized with olefins such as butene, hexene or octene, polypropylene copolymers, including copolymers with olefin monomers, polyester polymers, such as polyethylene terephthalate (PET), polyester copolymers, such as PET copolymers, amorphous polyesters, polyurethanes, copolyesters, polyvinyl butyral (PVB), polyacrylates, including thermal and UV curable acrylic resins, and the like, where the polymers and copolymers have melting or softening point temperatures between about 65 and about 265° C.

The films are highly stretched, as much as possible, in one direction for unidirectional films and in perpendicular directions for biaxially stretched films. Preferred films are stretched between about 2× and about 40× in one direction in unidirectional films, and in both directions in biaxially stretched films. More preferably, films are stretched between about 2× and about 40× in only one direction (uniaxial). After stretching, the film has a tensile strength above about 20,000 psi as measured by ASTM D-882, in the stretched direction(s). The tensile strength is preferably above about 30,000 psi. More preferably, the tensile strength is above about 45,000 psi. For the present disclosure, the term "stretched" is defined as the elongation of a polymer film layer in one or more directions. Typically film layers are stretched in one direction (uniaxially stretched) or two directions at 90 degrees to one another (biaxially stretched). The term "oriented" is defined as the relative orientation of successive film layers with regard to their stretching direction(s).

Core polymer film layers have a thickness between about 5 and about 2,000 microns and preferably between about 5 and about 100 microns. Heat fusible coating layers should be as thin as possible, about one micron or less and no more than about one third of the core layer thickness. Heat fusible coating layers between about one and about twenty microns are more preferred. In other embodiments, the heat-fusible coating layers are <1 to about 100 microns thick, or about 1 to about 50, or about 2 to about 40, or about 3 to about 30, or about 4 to about 20, or about 5 to about 10 microns thick.

According to one embodiment of this aspect of the present invention, heat fusible coating layers are applied to at least one side of each core polymer film layer by co-extrusion or a separate coating process. More preferably, the heat fusible coating layers are applied on both sides of the each core polymer film layer by co-extrusion.

One co-extrudate according to the present invention combines compatible core polymer film layer and heat fusible coating layer polymers that adhere together during the co-extrusion process. Another co-extrudate according to the present invention combines incompatible core layer and heat fusible coating layer polymers and requires the co-extrusion of an adhesive layer to coat the core polymer layer with at least one heat fusible polymer layer. Suitable adhesives for the adhesive layer should be chemically and physically compatible with both the core layer polymer and the heat fusible coating layer polymer and can include polyacrylates, polyurethanes, ethylene-acrylic acid (EAA) copolymers, ethylene-methacrylic acid (EMA) copolymers, acid- or maleic anhydride-modified polyethylene, acid- or maleic anhydride-modified polypropylene, or polymeric ionomers.

According to another embodiment of the laminate-forming method of the present invention, at least one heat fusible coating layer is applied to the core polymer layer by post extrusion. The core polymer layers are extruded separately prior to surface layer coating. At least one heat fusible layer is extruded onto the core layer via conventional extrusion methods.

One post-extrudate according to the present invention combines compatible core polymer film layer and heat fusible coating layer polymers that adhere together during the post-extrusion process. Another post-extrudate according to the present invention combines incompatible core layer and heat fusible coating layer polymers and requires coating an adhesive layer onto the core polymer film layer with at least one heat fusible polymer layer by co-extrusion of adhesive layer and heat fusible polymer layer. Examples of suitable adhesive layers are disclosed above in the examples of incompatible co-extrudates.

According to another embodiment of the laminate-forming method of the present invention, the surface coated core polymer layers are formed by coating at least one of the core polymer layers with a water-based or solvent-based solution of the heat fusible coating layer polymer or a precursor thereof. In one embodiment, prior to coating the core polymer film layer is optionally uni- or biaxially stretched, and unidirectional stretching is preferred. In another embodiment, the core polymer film layer is optionally uni- or biaxially stretched after coating, and unidirectional stretching is preferable. The embodiment of coating prior to stretching is more preferable because it can be integrated into an inline process and also the heat fusible layer can obtain high tensile strength. The core layer polymer surface is preferably pretreated by corona discharge or other surface modification treatment, which is typically done subsequent to the film stretching process and prior to the coating process, in order to modify the surface chemical structure and improve adhesion between the core layer polymer and the heat fusible coating layer polymer. The coatings can be thermally cured (e.g. siloxanes), or UV cured (e.g. polyacrylates, polyurethanes), or electron-beam (E-Beam) cured. Prior to lamination, the coatings can be either dried or fully cured. If the heat fusible layer is not fully cured, a post UV or thermal or E-Beam curing can be employed to further improve the adhesion between adjacent core polymer layers.

According to one aspect of present invention, a plurality of heat-fusible-layer coated core polymer layers are axially stretched (more preferably uniaxially stretched), cut into predesignated dimensions and oriented and stacked, followed by lamination. In one embodiment, the laminate is composed of cross-plied axially stretched films (more preferably uniaxially stretched), which is the most preferable embodiment. In another embodiment, at least about 20% of the films are cross-plied in the laminate. In another embodiment, the laminate is composed of angle-plied uniaxially stretched films. In another embodiment, at least about 20% of the films are angle plied in the laminate. In another embodiment, the laminate is composed of at least two of the following components: cross-plied subunits, angle plied subunits and arbitrarily oriented films. In another embodiment, the laminate is composed of a plurality of subunits where at least 2 films have the same orientation, and these subunits are completely cross-plied, at least 20% cross-plied, angle-plied, at least 20% angle-plied, or contain at least two of the following components: cross-plied, angle-plied and arbitrarily oriented subunits.

Laminates according to the present invention preferably contain between about 3 and about 4,000 coated core polymer film layers. Bonded laminates according to the present invention have a thickness of between about 0.2 and about 10 cm, or between about 0.2 and about 5 cm, more preferably about 0.2 and about 2.5 cm. In some embodiments the laminate thickness is about 0.3 to about 10 cm. In other embodiments the laminate is 0.2, 0.4, 0.5, 0.75, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10 cm thick.

In one embodiment of this aspect of the present invention, the laminates are formed from core polymer film layers consisting of the same polymer. In another embodiment of this aspect of the present invention, hybrid laminates are provided in which core polymer film layers of two or more different polymers are employed. One hybrid laminate according to this aspect of the present invention consists of core polymer film layers in which layers of different core polymers alternate within the laminate, so that no two adjacent core polymer film layers consist of the same polymer. Another hybrid laminate according to this aspect of the present invention consists of a plurality of sub-laminates, where each sub-laminate consists of a plurality of core polymer film layers of the same polymer, and sub-laminates of different polymers alternate within the laminate, so that no two adjacent sub-laminates consist of the same polymer. In all embodiments, adjacent core polymer film layers of the same or different polymer are bonded together by heat fusible coating layers.

A method of forming bonded laminates according to the present invention is fusion bonding a plurality of core polymer film layers that are coated with heat fusible layers on at least one surface of each core polymer film layer under heat and pressure, where the coated core polymer film layers are axially stretched 2× to 40×. The heat fusible polymer layers are thinner than the core polymer film layers, the melting point or softening temperature of the heat fusible polymer is at least 3° C. lower than the melting point or softening temperature of the core layer polymer, and the coated core polymer film after stretching has a tensile strength above about 20,000 psi as measured by ASTM D-638, in the stretched direction.

The fusion bonding of heat-fusible-layer coated core polymer layers is performed by compression heating, where heat is applied at a temperature that is at least about 3° C. below the melting or softening point temperature of the core layer polymer and at or above the melting or softening point temperature of the heat fusible layer polymer, and the bonding pressure is between about 20 and about 5000 psi, preferably between about 20 and about 3000 psi, more preferably above about 200 psi.

For transparent laminates, the thinner, lower melting or softening point heat-sealable polymer coating layers permit the use of lower lamination temperatures, which in turn results in the formation of bonded laminates with both improved physical and optical properties. In particular, the low temperature bonded laminates of the present invention are less hazy and more transparent than prior art materials. The lower lamination temperature also prevents molecular polymer chain relaxation to maintain the high mechanical strength, thereby improving the impact resistance properties of the bonded laminate.

Preferred laminate-forming methods reduce or eliminate surface electrostatic charges and remove dust from film surfaces prior to lamination to reduce haze. Electrostatic charges are removed by electric discharge to prevent dust accumulation on film surfaces. The accumulation of dust can also be prevented by forming the laminates under clean room conditions.

According to one aspect of the present invention, the fusion bonded laminate is formed by placing a plurality of stretched and oriented coated core polymer film layers in a compression mold that is placed between two steel platens of a compression press, under appropriate heat and pressure.

The present invention incorporates the discovery that the optical properties of transparent bonded laminates are affected by 1) intrinsic properties of the coated core polymer film layers, 2) lamination process control during laminate formation, and 3) the surface quality of the compression mold contacting the polymer layers.

According to one aspect of this invention, the core polymer film layers and heat fusible layers are compounded with additives to enhance the performance. The films can be compounded with one or more additives. The additives include colorants, ultraviolet (UV) absorbers, infrared (IR) absorbers, heat or thermal stabilizers, antioxidants, plasticizers, nucleators, clarifiers, etc. The role of colorant is to disguise any yellowing in the polymer produced during the thermal processes; UV absorbers and stabilizers absorb the UV radiation from the sunlight to protect both the laminates and the users; IR absorbers absorb the infrared radiation to protect against laser light; antioxidants prevent polymer oxidization during thermal processes; and nucleators and clarifiers improve the optical properties of film laminates, reducing the haze and increasing transmittance. In one embodiment, both the core polymer film layers and the heat fusible layers are compounded with additive(s). In another embodiment, only core polymer film layers are compounded with additive(s). In another embodiment, only heat fusible layers are compounded with additive(s). In another embodiment, neither core polymer film layers nor the heat fusible layers are compounded with additive(s).

According to another aspect of the present invention, a more accurate temperature control method is used versus those disclosed in the prior art. Instead of using simple press platen heating and cooling, a temperature control unit (TCU) is employed to provide more uniform temperature distribution across the surfaces, more accurate temperature setting, and more rapid heating and cooling, to produce less hazy and more transparent fusion bonded laminates. According to another preferred aspect of the present invention, the compression mold surface is well polished; the cross-plied films are placed between the surfaces of the compression mold; the mold is either mounted on the platens of the compression press or transferred between the platens; then the mold experiences heating and cooling cycles under appropriate pressures and temperature control can be facilitated by the compression press or other temperature control means, or by the combination of compression press and another temperature control means. The compression molds are designed and manufactured according to the specific application and article. According to the application type, the moldable area in the compression mold can be flat, cylindrical, spherical, free-form (of free topology), and the like. Thus, a variety of transparent armor articles can be fabricated by using different specific compression molds.

According to another aspect of the present invention, the mold surface is well polished to a mirror finish. In one embodiment of the present invention, the mold material is aluminum; in another embodiment, the mold is more preferably made of steel or stainless steel. In one embodiment of present invention the mold is polished by hand; in another embodiment the mold is polished by a computer controlled machining process.

The bonded laminates have a tensile strength, as measured by ASTM D-638, at least about 20% higher than the tensile strength of monolithic polycarbonate sheets or monolithic sheets of the same core layer polymer of equivalent thickness (fabricated by extrusion or injection molding). This provides an improvement in the $V_{50}$ ballistic performance of at least about 10% in comparison to the $V_{50}$ ballistic performance of a monolithic sheet of polycarbonate or the same core layer polymer of equivalent thickness.

The standard statistical $V_{50}$ ballistic limit identifies the average velocity at which a bullet or a fragment penetrates 50% of the tested material versus non-penetration in the remaining 50% of the material tested, as defined in MIL-STD-662F. Preferred bonded laminates possess at least about a 10% improvement in $V_{50}$ ballistic performance compared to the $V_{50}$ performance of a monolithic sheet of polycarbonate or the same core layer polymer (fabricated by extrusion or injection molding) having either the same thickness or the same areal density (weight per unit area, typically shown as pounds per foot squared or kilogram per meter squared). More preferably, the bonded laminates possess at least a 25% improvement in $V_{50}$ ballistic performance versus monolithic sheets of polycarbonate or the same monolithic core layer polymer having either the same thickness or the same areal density.

In aspects of the present invention, the optical properties are efficiently improved versus prior art film laminates. Haze is the most critical characteristic in determining the optical properties of the laminates. Per ASTM D1003, haze is defined as the percentage of light which during passage through a laminate deviates from the incident beam by more than 2.5 degrees on average. Haze is typically measured by a haze meter that complies with the ASTM D1003 standard. Per the MIL-PRF-32432 standard, the haze of military grade lenses should be less than about 3% for spectacle and goggle applications. The haze value of the bonded laminates should be as low as possible. In one embodiment, the haze of a ⅛" bonded laminate composed of stretched core layers coated with heat a fusible layer on at least one side, is at least less than about 10%; preferably the haze value of a ⅛" laminate is less than about 5%; and more preferably the haze value of a ⅛" laminate is less than about 3%. The haze of a bonded laminate increases as the laminate thickness increases. Thus the haze value of a ⅛" bonded laminate is used as a reference to compare between the laminates that have different stacking, or different orientation, or different materials, or different thicknesses. The bonded laminate has a thickness between about 0.2 and about 10 cm, and the reference ⅛" laminate of the same orientation and material has a haze value less than 10%, preferably less than 5% and more preferably less than 3%.

The fabricated transparent polymeric laminates have a relatively soft surface and therefore might not have sufficient scratch or abrasion resistance; thus, a hard coating may be required, applied to the laminate's surfaces to protect them from scratch and abrasion. Prior to the hard coating process, the laminate's surfaces might need to be pre-treated to achieve a good bonding with the hard coating resin.

It is common that very high hardness coating layers that have high abrasion and/or scratch resistance, cannot be applied to conventional types of commercial transparent polymeric armor, because the very hard coating layer can cause brittle failure on the transparent armor upon ballistic impact. If the desired hardness cannot be achieved, the lifetime of the resulting transparent articles could be considerably shortened. In contrast, very high hardness coating layers can be applied to the laminates of the present invention without causing brittle failure during ballistic events. The laminates of the present invention take advantage of polymer fracture mechanics through mechanically isolated individual laminate layers, to maximize the energy absorption by containment of the deformation of each film layer, which also prevents crack propagation through the layers from exceeding its critical stage.

According to one aspect of present invention, the hard coating formulation comprises ingredients selected from resins, oligomers, monomers, initiators, solvents and/or additives. Not all of the components are necessarily included in the hard coating formulation, but the coating formulation should include at least an initiator and at least one hard coat resin component, such as an oligomer or monomer. The ingredients in the coating formulation are preferably chemically compatible with each other.

The hard coat formulation can be applied to the laminates via dip coating, spray coating, float coating, curtain coating, spin coating, blade coating, and the like. The polymeric coating can be cured by heat, UV or E-Beam. The curing time, radiation energy density (for UV curing) and temperature (for thermal curing) is optimized to obtain a crack-free and fully cured coating layer. The hard coated laminates can extend their service life compared to non-coated laminates, and also improve abrasion and/or scratch and/or wear resistance. More preferably, the hard coated film laminates maintain non-brittle failure under ballistic impact, while retaining their ballistic performance under all humidity and other environmental conditions.

The transparent laminated article fabricated according to the present disclosure can be used as protective eyewear and face shields, windows and vision blocks for armored vehicles, ballistic shield windows, goggles, aircraft transparencies and sensor windows, infrared domes for missiles, and laser ignition windows for medium and large caliber cannons. Other commercial applications include law enforcement vehicle windows, ballistic shields, face shields, and executive protective armor.

The bonded laminate of the present invention can be further laminated with other polymeric and/or non-polymeric sheets to further improve the ballistic impact-resistance for transparent and/or opaque armor applications, such as windows for combat vehicles, vehicle body armor, ballistic shields, and the like. Polymeric sheet materials include polymethyl-methacrylate (PMMA), polycarbonates (PC), polyetherimides (PEI), polyethersulfones (PES), thermoplastic or thermosetting polymeric composites (such as glass fiber-reinforced or carbon fiber-reinforced epoxy), and the like. Non-polymeric sheet materials include glass (both annealed and heat treated), ceramics and metal (such as steel or aluminum), and the like.

The foregoing and other objects, features and advantages of the present invention are readily apparent from the detailed description of the preferred embodiments set forth below, taken in conjunction with the accompanying drawings, where the thickness of polymer layers is drawn to illustrate the relationship between layers in the laminate, and hence is not necessarily drawn to scale.

BRIEF DESCRIPTION OF THE DRAWINGS

FIGS. 1A, 1B, 1C and 1D depict laminate layers according to four embodiments of the present invention.

FIGS. 2A and 2B depict hybrid laminates according to two embodiments of the present invention.

FIGS. 3A, 3B and 3C depict the film orientation in the laminates according to three embodiments of the present invention.

FIG. 4 depicts an automated film cutting and stacking process according to the lamination method of the present invention.

FIG. 5 depicts a prior art compression molding apparatus for film lamination.

FIGS. 6A and 6B depict a compression molding apparatus for film lamination of the present invention, illustrating two embodiments of the present invention; FIG. 6C depicts the schematic drawing for water line distance design in a mold.

FIG. 9 depicts two different film orientations in the Example: Effect of Lamination Orientation—Cross-ply vs. Non Cross-ply vs. Angle-Ply. The left stack is a 0/90 cross-ply and the right stack is a 0/45/90/−45/0 orientation.

FIG. 10A displays a graph of $V_{50}$ ballistic performance versus thickness for PC, PMMA, PC/PMMA laminates and UOPP laminates of the present invention.

FIG. 10B displays a graph of $V_{50}$ ballistic performance versus areal density for PC, PMMA, PC/PMMA laminates and UOPP laminates of the present invention.

DETAILED DESCRIPTION OF PREFERRED EMBODIMENTS

Figure 1D:
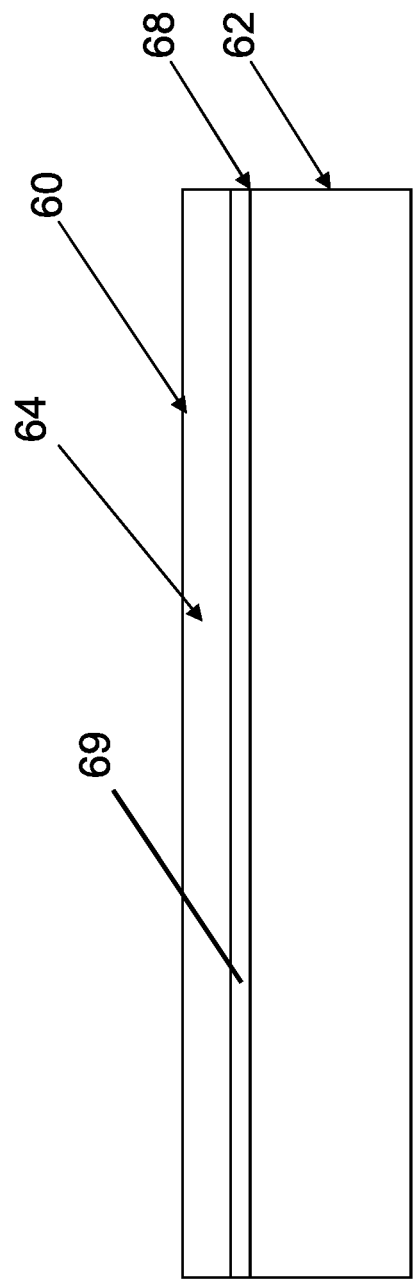

Advanced high performance impact-resistant polymeric film laminates are provided, with $V_{50}$ ballistic performance at least about 10% greater than current state-of-the-art transparent armor materials at the same thickness or areal density, such as polycarbonates. The inventive laminates are prepared from high strength and/or high elastic modulus axially stretched and oriented polymer films with optimized surface fusible layers coated on at least one surface, but preferably both surfaces. The inventive laminates have considerably improved optical properties compared to the prior art film laminates.

A laminate layer 10 according to the present invention is depicted in FIG. 1A. Core polymer film layer 12 has compatible heat fusible polymer coating layers 14 and 16 applied to respective top and bottom surfaces 18 and 20. In the embodiment depicted in FIG. 1B, laminate layer 30 consists of a core polymer film layer 32 that is incompatible with the heat fusible coating layers 34 and 36 on the respective top and bottom surfaces 38 and 40 thereof, and adhesive layers 42 and 44 secure respective heat-fusible coating layers 34 and 36 to the respective top and bottom surfaces 38 and 40 of core layer 32.

In the embodiments depicted in FIGS. 1C and 1D, a heat fusible coating layer is applied to only one surface of the core polymer layer. Laminate layer 50 of FIG. 1C has core polymer film layer 52 with compatible heat fusible coating layer 54 applied to the top surface 58 thereof. Laminate layer 60 of FIG. 1D has core polymer film layer 62 with incompatible heat fusible coating layer 64 secured to the top surface 68 thereof by adhesive layer 69.

The films can be non-stretched, unidirectionally stretched, or biaxially stretched. Unidirectionally and biaxially stretched films are preferred, and unidirectionally stretched films are the most preferred. Core layer films with thicknesses in the range of about 25 to about 100 microns are preferred for laminate armor applications. In some embodiments the core layer film thickness is about 30 to about 90 microns, or about 40 to about 80 microns, or about 50 to about 70 microns, or about 60 microns.

The heat fusible coating layer polymers have a melting point or softening temperature at least 3° C. lower, and preferably at least 10° C. lower, than the core layer polymer melting point or softening temperature. Typically, the melting or softening point temperature of the heat fusible coating layer polymer is from about 65 to about 265° C. compared to a melting or softening point temperature of between about 100 and about 350° C. for the core layer polymer. Preferably, the melting point or softening temperature of the heat fusible coating layer polymer is about 80 to about 200° C. compared to a melting or softening point temperature of between about 120 and about 260° C. for the core layer polymer. Most of the melting or softening temperatures can be obtained from manufacturer's datasheets; otherwise, softening temperature is defined and measured according to ASTM D-1525, and melting temperature is measured by Differential Scanning calorimetry (DSC).

The thickness of the heat fusible coating layer is as thin as possible, from less than about one micron to no more than about one-third of the thickness of the core film layer. The heat fusible coating layer is preferably less than about one-fifth of the thickness of the core polymer film layer. The heat fusible coating layer is more preferably less than about one-tenth of the thickness of the core polymer film layer.

Essentially any polymer capable of being directionally stretched is suitable for use in the present invention. Examples of suitable core layer polymers include polyethylene, such as HOSTALEN® GD9555 from Basell Polyolefins, polypropylene, such as MOPLEN® from Basell Polyolefins, polypropylene copolymers, such as MOPLEN® HP520 from Basell Polyolefins, polyethylene terephthalates (PET) and its copolymers, such as INVISTA® 3301 from Invista, polyacrylates and their copolymers, including polymethylmethacrylates (PMMA), such as EG920 PMMA from LG Chemical, cyclic olefin copolymers (COC), such as TOPAS® 6013F-04 from Topas Advanced Polymers, polycarbonates (PC) and their copolymers, such as MAKROLON® 1239 from Bayer Material Science, polyetherimides (PEI), such as ULTEM® 8015 from SABIC Innovative Plastics, polyethersulfones (PES), such as ULTRASON® P3010 from BASF, and the like, all of which have melting point temperatures between about 100 and about 350° C.

Heat fusible coating layer polymers should be chemically compatible with core layer polymers, for example, polyethylene (PE) and its copolymers, e.g., ethylene-vinyl acetate copolymers, ethylene acrylic acid copolymers, linear low density polyethylene, ultra-low density polyethylene, polymeric ionomers, etc., such as NUCREL® 0609HSA ethylene meth-acrylic acid copolymer from Dupont and Polyethylene 1211G1 from Dow Chemical, are compatible with core polymer PE films and polypropylene copolymers such as ADSYL® 5C30F from Basell Polyolefins are compatible with core polymer PP films.

If there is no compatible heat fusible polymer available, an adhesive layer is used to bond the heat fusible polymer coating layers to the core polymer layer, as depicted in FIGS. 1B and 1D. Suitable adhesives, used when the polymer film core layer and heat fusible film layers are incompatible, include polyacrylates, polyurethane, ethylene-acrylic acid (EAA) copolymers, ethylene-methacrylate (EMA) copolymers, acid or maleic anhydride modified polyethylene, acid or maleic anhydride modified polypropylene, or polymeric ionomers, and the like. Adhesive layers, when present, have thicknesses from less than a micron up to about 50 microns, and preferably have a thickness less than one-half of the thickness of the heat fusible layer.

Both the core layer polymer films and the heat fusible layers preferably have a density between about 0.90 and about 1.80 g/cc. More preferably, the density of the core polymer layer film is about 0.90 g/cc, and the density of the heat fusible layer is about 0.90 to about 1.2 g/cc The heat fusible polymer layers are coated onto the core polymer layer by co-extrusion, post-extrusion application or solution coating.

When co-extrusion is employed for unidirectionally and biaxially stretched films, axial stretching is performed after the core polymer film and heat fusible polymer layers are co-extruded together. When post-extrusion application is employed for unidirectionally and biaxially stretched films, axial stretching is performed after the heat fusible polymer layers are post-extruded onto an unstretched pre-formed core polymer film layer. When the heat fusible polymer layer is solution coated onto the core polymer layer, axial stretching, when employed, is performed prior to coating the core polymer layer with the heat fusible polymer layer. Corona discharge treatment or other surface modification treatment of the core polymer layer might be required to improve adhesion, and is performed after axial stretching but prior to solution coating.

In one embodiment of present invention, co-extrusion is an in-line process using multiple extruders to produce the multi-layered film structures depicted in FIGS. 1A-1D. One co-extrudate according to the present invention combines compatible core polymer film layer and heat fusible coating layer polymers that adhere together during the co-extrusion process. Another co-extrudate according to the present invention combines incompatible core layer and heat fusible coating layer polymers and requires the co-extrusion of an adhesive layer in order to coat the core polymer layer with at least one heat fusible polymer layer. Suitable adhesives for the adhesive layer should be chemically and physically compatible with both the core layer polymer and the heat fusible coating layer polymer and may include polyacrylates, polyurethanes, ethylene-acrylic acid (EAA) copolymers, ethylene-methacrylic acid (EMA) copolymers, acid- or maleic anhydride-modified polyethylene, acid- or maleic anhydride-modified polypropylene, or polymeric ionomers.

In one embodiment of present invention, post-extrusion is used to coat heat fusible layers on core polymer film layers. Post-extrusion is very similar to co-extrusion; see above for appropriate process and material selection. The only difference is that the heat fusible layer is extruded onto an existing core polymer layer. One benefit of the post-extrusion is that the core polymer layers can be directly obtained from commercially available plastic sheets.

In one embodiment of present invention, solution coating is employed to coat heat fusible layers onto core polymer film layers. Solution coating of the heat fusible polymer layers onto core polymer layers is an off-line process using a solvent- or water-based polymer or polymer precursor to coat a thin layer of lower melting point or lower softening temperature polymer onto the core polymer layer surface(s). The heat fusible polymer layers applied by solution coating processes tend to be thinner, typically from less than one micron to less than about one-quarter of the core layer thickness. In one embodiment of the present invention, the core polymer films which have low surface energy including polypropylene, polyester, and the like, require corona treatment or other surface activation treatment to oxidize the surface in order to generate functional groups and increase surface energy. In another embodiment of the present invention, the core polymer films which have high surface energy, such as PC, PET, PETG, nylon, TPU, polyacrylate, EVA, EMA, and the like, usually don't require additional surface treatment before hard coating. However, surface treatment can be still applied to the high surface energy films if necessary.

Three types of hard coating resins are preferred for the coating process: acrylic resins, polyurethane resins and siloxane resin systems. Amorphous polyester can also be solvent coated onto some of the core films, such as polyethylene terephthalate (PET) film. The minimum fusion temperature can be adjusted by conventional modification of the chemical structure of the resins, such as by adjusting the amount and type of co-monomer, e.g., butyl acrylate or octyl acrylate, in an acrylic resin, or the amount and type of the soft segment, e.g., polyester polyol or polyether polyol, in a polyurethane resin. Siloxane hard coating resin systems include but are not limited to methyl silicone, methyl/phenyl silicone, alkoxy silicone, epoxy silicone, mercapto silicone, alicyclic epoxy silicone, and the like.

Polymer precursor coating processes according to the present invention include applying a UV, E-Beam or thermally curable coating onto a core film. After a plurality of surface coated films are consolidated under heat and pressure to form the bonded laminate, the laminate is subsequently exposed to heat or UV radiation to form a cross-linked polymer network between two adjacent heat fusible layers to create a much stronger bond.

Preferred polymer precursor coating processes according to the present invention apply a UV curable fusible acrylic, siloxane or polyurethane resin onto stretched core film layers. A cross-linked polymer network between two adjacent heat fusible layers is formed upon exposure of the bonded laminate to UV radiation.

For all of the co-extruded, post-extruded or solution-coated embodiments, axial stretching is performed by conventional means, using, for example and without limitation, unidirectional drawing, blow film extrusion, sequential biaxial stretching, simultaneous longitudinal and transverse drawing, the double bubble process, and the like. Stretched films are stretched as high as possible, in one direction for unidirectional films and in both machine (MD) and transverse directions (TD) for biaxially stretched films. Unidirectional film stretching is more preferable. Films stretched between about 2× and about 40× in one direction in unidirectional films and in both directions in biaxially oriented films are preferred, with films stretched between about 4× and about 40× in either or both directions being more preferred. For biaxially stretched films the stretching factor in the machine and transverse directions can be the same or different.

Suitable stretched core layer polymer films with heat fusible layers should have tensile strength greater than 20,000 psi as measured by ASTM D-882 in the main stretched direction. The tensile strength of the film is preferably above about 30,000 psi in the stretched direction. More preferably, the tensile strength of the film is above about 45,000 psi in the stretched direction.

Laminates according to one embodiment of the present invention consist of plural layers of the same core polymer. According to another embodiment of the present invention, hybrid film laminates are provided in which core polymer film layers of two or more different polymers are employed. One hybrid film laminate according to this embodiment consists of core polymer film layers in which core layers of different polymers alternate within the laminate (alternate film stacking), so that no two adjacent polymer film core layers consist of the same polymer.

Such a laminate 75 is depicted in FIG. 2A, where core layers 80a, 80b, 80c, etc., of a first polymer alternate with core layers 82a, 82b, 82c, etc., of a second polymer. Heat fusible coating layers on the top and bottom surface of each core polymer film layer form heat fusible layers 84a, 84b, 84c, etc., that bond the laminate together. Alternatively, the heat fusible coating layers can be applied to only one surface of each core polymer film layer (not shown). If necessary, adhesive layers can be used to bond together incompatible film layers (not shown).

Another hybrid film laminate according to this aspect of the present invention consists of a plurality of sub-laminate blocks, where each sub-laminate block consists of a plurality of core polymer film layers of the same polymer and sub-laminate blocks of different polymers alternate within the laminate, so that no two adjacent sub-laminates consist of the same polymer (alternate block stacking). Such a laminate 90 is depicted in FIG. 2B, consisting of sub-laminate blocks 92, 94, 96, 98, etc. Sub-laminate blocks 92 and 96 consist of core layers 88a, 88b, 88c, 88d, etc., of the same first polymer and sub-laminate blocks 94 and 98 consist of core layers 86a, 86b, 86c, 86d, etc., of the same second polymer.

Heat fusible coating layers on the top and bottom surface of each core polymer film layer form heat fusible layers 100a, 100b, etc., that bond the sub-laminate block layers together and also join adjacent blocks together. Likewise, the heat fusible coating layers can be applied to only one surface of each core polymer film layer (not shown). If necessary, adhesive layers can be used to bond together incompatible layers (not shown). In all embodiments, adjacent core polymer film layers of the same or different polymer are bonded together by heat fusible coating layers.

Examples of hybrid film stacked polymer combinations include acrylic coated unidirectionally stretched polypropylene in combination with acrylic coated unidirectionally stretched polyethylene terephthalate, or in combination with unidirectionally stretched thermoplastic polyurethane.

Laminates according to the present invention preferably contain between about 3 and about 4,000 core polymer film layers. In some embodiments the laminates contain about 10 to about 4000, or about 20 to about 4000, or about 50 to about 4000, or about 75 to about 4000, or about 100 to about 4000, or about 150 to about 4000, or about 200 to about 4000, or about 250 to about 4000, or about 300 to about 4000, or about 400 to about 4000, or about 500 to about 4000, or about 750 to about 4000, or about 1000 to about 4000 core polymer film layers. Bonded laminates according to the present invention are between about 0.2 and about 10 cm thick. In some embodiments the laminates are about 0.25 to about 10 cm thick, or about 0.3 to about 10, or about 0.4 to about 10, or about 0.5 to about 10, or about 0.6 to about 10, or about 0.7 to about 10, or about 0.8 to about 10, or about 0.9 to about 10, or about 1 to about 10, or about 2 to about 10, or about 3 to about 10, or about 4 to about 10, or about 5 to about 10 cm thick. In other embodiments the laminate is 0.25, 0.4, 0.5, 0.75, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10 cm thick.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention. The term "about" generally refers to plus or minus 10% of the indicated number. For example, "about 10%" may indicate a range of 9% to 11%, and "about 20" may mean from 18 to 22. Other meanings of "about" may be apparent from the context, such as rounding off; so, for example "about 1" may also mean from 0.5 to 1.4.

In preferred embodiments the core polymer film layers of the laminates are uniaxially stretched and coated with heat-fusible layers on both side. In preferred embodiments the uniaxially stretched and coated core polymer film layers are cut into predesignated dimensions and cross-plied to form the laminates.

Early in the development of the presently disclosed technology, cross-plying was used in the preparation of hybrid laminated films with thermoplastic composites, for example, with cross-plies of S2 glass polypropylene composite, for vehicle or tank armor applications. One goal of this early work was to stop small arms 5.56 mm and 762 mm balls or projectiles at muzzle velocity.

The term "cross-plied" as used herein generally means a 90 degree orientation of each successive uniaxially stretched ply or the main stretched direction of bi-axially stretched ply with regard to its direction of stretching. Such a laminate 300 is depicted in FIG. 3A, consisting of uniaxially stretched film 302 at 0 degree and uniaxially stretched film 301 at 90 degree. In another embodiment, the laminate is composed of at least about 20% cross-plied films (also referred to as a subunit) and the rest of the films are not cross-plied. Laminate 310, 320, and 330 are the 3 configurations in this embodiment, as depicted in FIG. 3B. The non cross-plied films (subunit) can be oriented to any selected degree, and the 0 degree films depicted in FIG. 3B are shown only for illustration purposes. The cross-plied subunit can be 2 to 3000 cross-plied films. In laminate 310, the cross-plied subunits are continuous at a certain location in the laminate, and this location can be anywhere inside the laminated, not limited in as shown in FIG. 3B. In laminate 320, the numbers of films in different cross-plied subunits are identical. These subunits are separated by non cross-plied films and the number of non cross-plied films in each separation can be either the same or different. The non cross-plied films can be oriented to any selected degree, and the 0 degree films shown in FIG. 3B are solely for illustration purposes. In laminate 330, the numbers of films in each cross-plied subunit are different. These subunits are separated by non cross-plied films and the number of non cross-plied films in each separation can be either the same or different. The non cross-plied films can be oriented to any selected degree, and the 0 degree films exemplified in FIG. 3B are shown solely for illustration. In another embodiment, the laminate is an angle-plied laminate consisting of a plurality of uniaxially stretched and coated core polymer film layers that are oriented at degree $+\theta$ and $-\theta$. The orientation degree $\theta$ can be anywhere between 0° and 90°, excluding the 0° and 90° points. In FIG. 3C, $\theta=30°$ for illustration purposes. In some embodiments, $\theta$ encompasses 10, 15, 20, 30, 45, 60, 67, 76, 80 degrees, and the like. Laminate 340 is an angle-plied laminate, composed of uniaxially stretched film 342 at +30 degrees and uniaxially stretched film 341 at −30 degrees. In another embodiment, the laminate contains at least about 20% of angle-plied subunits. The location of these subunits can be either continuous or non-continuous. The numbers of films in these subunits can be either the same or different. The numbers of non angle-plied films in between adjacent subunits can be either the same or different. The orientation of these non angle-plied films can be anywhere between 0° and 90°, excluding 0° and 90°. In another embodiment, the laminate is composed of at least of two of the following components: cross-plied subunits, angle-plied subunits and arbitrarily oriented films. The number of films in each component can be either the same or different. The relative locations of these components in the laminates can be completely ordered, partially ordered, or random. In another embodiment, the laminate is composed of subunits where at least 2 films have the same orientation, and these subunits are cross-plied or at least 20% of the laminate is composed of cross-plied subunits that are continuously distributed in the laminate, or equally distributed in the laminate, or randomly distributed in the laminate; or the subunits are angle-plied to form the laminate; or at least 20% of the laminate is composed of angle-plied subunits that are continuously distributed in the laminate, or equally distributed in the laminate, or randomly distributed in the laminate; or the formed laminate is composed of at least two of the following components: cross-plied subunits, angle-plied subunits and arbitrarily oriented subunits.

Cross-plying the coated core polymer film layers, combined with the disclosed manufacturing process provides the required antiballistic properties of the resulting laminates, which laminates are superior to those described in the prior art, vide infra.

The fusion bonding of core polymer layers that have been surface coated with at least one heat fusible layer, stretched and oriented, is performed by compression molding; for example, by the process depicted in FIG. 5, where heat is applied at a temperature at least about 3° C., and preferably at least about 5° C., and more preferably at least 10° C., below the melting or softening point temperature of the core layer polymer and at or above the melting or softening point temperature of the heat fusible coating layer polymer. The bonding pressure is between about 20 and about 5000 psi, preferably between about 20 and about 3000 psi, and more preferably above about 200 psi. In some embodiments the lamination pressure is about 150 to about 5000 psi, or about 500 to about 5000 psi, or about 1000 to about 5000 psi. In some embodiments the lamination pressure is ≥150 psi, or ≥200 psi, or ≥300 psi, or ≥500 psi, or ≥1000 psi, or ≥2000 psi, or ≥4000 psi, or about 5000 psi. The laminate consolidation of the surface coated films can be done using conventional compression molding apparatuses such as Vantage Series™ Compression Molding Presses from Wabash MPI, Wabash, Ind., equipped with heated steel platens between which heat and pressure is applied to fusion bond polymer film laminates. Vacuum can also be applied during consolidation/laminate formation under pressure and heat to improve the quality of the bonded laminate.

According to the prior art that discloses fabrication of heat fusible laminates, no pressure, or only weak pressure, is applied to the laminates during the cooling cycle. However, it has now been discovered that the lamination pressure should be maintained during the cooling cycle in order to avoid laminate shrinkage upon cooling. Further, if no appropriate cooling pressure is applied, the optical and ballistic properties of the laminates deteriorate. Typically, the cooling pressure should be equivalent to the lamination pressure. Preferably, the cooling pressure is between about 20 and about 5000 psi, preferably between about 20 and about 3000 psi, and more preferably above about 200 psi.

The process according to the present invention improves the impact-resistance ballistic properties of the laminates and the optical properties of transparent laminates over prior art laminates and monolithic polymer sheets. As discussed and disclosed above, this is attributable at least to the following elements: 1) the presence of heat fusible layers lowers the lamination temperature to improve the optical properties and ballistic resistance; 2) use of films with very high tensile strength in the laminate; 3) maintaining at least 200 psi of lamination pressure during both the heating and cooling cycles; 4) the disclosed improved lamination process shortens cycling time and ensures temperature uniformity during lamination; 5) incorporating additives can efficiently lower the haze of the laminates and reduce the yellowing effects from processing and outdoor exposure (vide infra); 6) eliminating dust in the manufacturing environment; and 7) using a highly polished mold to fabricate the final shape of the laminates.

According to other processing refinements that provide improvements to optical performance in transparent laminates, heat stabilizers and UV stabilizers are optionally added to film resin formulations to reduce and even eliminate the yellowing that would otherwise occur from heating during the film stretching process or from sun exposure, and the UV absorber and stabilizer can also absorb the UV radiation from the sunlight to protect the users. Nucleators or clarifiers are optionally added to the film resin formulations that naturally form crystals upon heating, providing improvements to optical performance. When polymers crystallize upon heating, once the polymer crystal grows to a certain size, significant light scattering from the crystals reduces light transmission and increases haze.

In one embodiment, both core polymer layers and heat fusible layers are compounded with additive(s). In another embodiment, only the core polymer layer is compounded with additive(s). In another embodiment, neither the core polymer layer nor the heat fusible layer is compounded with additive(s).

The colorant can mask the yellowish color of the film and laminate sometimes obtained after thermal processing, and such colorants include, without limitation, transparent blue tint and Cu-phthalocyanine. Since the invention is applicable to transparent armor, it is preferable that the laminated article can absorb UV radiation to reduce damage to the eyes. UV absorbers include, without limitation, octabenzone, bumetrizole, hydroxyphenyl triazine, hydroxylphenyl benzotriazole and titanium oxide. UV stabilizers can trap free radicals that are formed from UV radiation-induced photodegradation processes in the film laminate. UV stabilizers include, without limitation, benzophenones, benzoate, tetramethyl-4-piperidinyl stearate and benzotriazole. Nucleators and clarifiers include, without limitation, aromatic carboxylic salts (e.g. sodium benzonate), talc, dibenzylidene sorbitol (DBS), sorbitol acetals, organophosphate salts, norbonane carboxylic acid salt, and the like.

The polymer resin additives are incorporated by conventional means during the original film formation process or in a polymer resin modification process. With one or more of these resin additives, used alone or in combination, the optical properties of the laminated films of the present invention are comparable to or better than optical properties of monolithic polycarbonate sheets.

To eliminate haze and light distortion caused by inclusions or dust, a clean room coupled with an electric discharging device can be employed to manage the film handling, cutting and stacking to prevent contamination. Electrostatic charges on film surfaces not only attract dust and other contaminants but also make the film difficult to handle and may result in trapped air bubbles or cause film slippage. Thus, electrostatic charges on the film surface can significantly impact the optical properties of transparent film laminates. An automated film cutting setup as shown in FIG. 4 assembled in a clean room will significantly reduce and even eliminate static charges on the film surfaces, thereby removing the majority of contaminants and dust from film surfaces, eliminate manual film cutting and improve the quality of the film laminates.

FIG. 4 depicts an automated film cutting device 400 in a clean room (not shown). Film web 402, consisting of a core polymer film co-extruded or coated with a heat fusible polymer layer, is unwound from roll 404 under guide roll 406. The web passes between electric discharge rods 408a, 408b, 408c, etc., with which electrostatic charges on the film are removed. The web then passes under vacuum 410, which removes dust and other contaminants, after which the automated film cutter 400 cuts the film web into sheets corresponding to the predesignated dimensions.

When stacked, unidirectionally stretched films are cross plied, and the film dimension is squared, a robot can automatically align the non-cross plied film stack 412 into a cross plied film stack with the desired sheet number or thickness.

When stacked, unidirectionally stretched films are cross plied, and the film dimension is non-squared, in one embodiment, more than one device 400 can be used in the film cutting process: one device 400 cuts films that have longer dimension in the machine direction (MD) and another device 400 cuts films that have shorter dimension along the MD. The robot can take the films from these two stacks alternatively to cross-ply the laminate. In another embodiment, only one device 400 is used, which can first cut a plurality of films that have longer dimension along the MD and place them aside; and then cut a plurality of films that have shorter dimension along the MD. A robot alternatively picks films from a long MD stack and a short MD stack to cross-ply the laminate with the desired sheet number or thickness.

The cross plied film stack is placed between the compression molds and then positioned between the platens of a compression molding device, preferably in a clean room, and fusion bonded to form a bonded laminate. This process refinement further reduces haze, and bonded laminate clarity and transparency are further improved.

Another processing refinement incorporates the discovery that, during the fusion bonding process, laminate cooling rates are much slower than the corresponding heating rates. Insufficient cooling of bonded laminates prior to removing from the compression molding machine results in shrunken, warped and distorted bonded laminates. Consequently the bonded laminates should not be removed from the compression molding machine until the bonded laminate temperature is cooled to below about 50° C., more preferably below about 38° C.

Variations in bonded laminate properties at different locations on the laminate surface are attributable to non-uniformity of heating and cooling temperatures across the laminate surface during fusion bonding. Most compression molding machines use cartridge heaters to heat the platens and use a combination of air and/or water to cool the platens. The cartridge heater is low cost and easy to install, but fails to achieve temperature uniformity throughout the platens. Additionally, conventional compression molding machines often have an insufficient number of water lines to cool the platens, thus the cooling rate is slow.

FIG. 5 depicts the heating and cooling system 112 of a prior art compression molding apparatus 110 bonding a film stack 114. Steel platens 116 and 118 with respective electrical heating elements 120 and 122 are cooled by respective water lines 124 and 126. Heating element 120 on the upper steel platen 116 serves to heat steel plate 128 and the cooling of upper steel platen 116 by water line 124 serves to cool steel plate 128. Likewise, heating element 122 on the lower steel platen 118 serves to heat steel plate 130 and the cooling of lower steel platen 118 by water line 126 serves to cool steel plate 130.

To improve the heating and cooling rates and temperature uniformity, a compression mold with a plurality of cooling channels is fabricated to provide adequate heat exchanging capacity. The compression mold is connected to a temperature control unit (TCU), either using water or oil as the heat exchange fluid, depending on the processing temperature. Temperature control using a TCU is more accurate and much faster than platen temperature control, and the temperature uniformity will be much improved, thus the quality and performance of the bonded film laminates will be significantly better.

FIGS. 6A and 6B depict such a temperature control design. The compression molds 620 and 621 are placed in between the steel platens 610 and 611, with the cross-plied films 600 in the middle. Insulating plates 630 and 631 are inserted between the mold and the platen to disable the heat dissipation in order to boost the heating and cooling efficiency. The flat mold in this figure is illustrative, and the actual moldable surface inside the mold can be cylindrical, spherical or any free-form topology. A plurality of water lines 622 are uniformly distributed along the mold surface. The appropriate water line layout is critical to provide uniform heating to the laminate in order to avoid optical distortion. The water line design should comply with the following equation:

$$d1 \geq \tfrac{1}{2} d2$$

where d1 is the distance of a water line center to the mold surface and d2 is the distance to adjacent water line centers. The schematic illustration is shown in FIG. 6C.

This equation provides guidance to water line design, but it also allows certain deviation. In some cases, the dimension of the compression mold does not allow the water line design to exactly comply with this equation. Therefore, d1 can be slightly less than ½ d2.

In one embodiment (as shown in FIG. 6A), a water TCU 640 is employed for temperature controlling, including both of heating and cooling. In another embodiment (as shown in FIG. 6B), a water TCU 640 is employed for heating cycle control and a chiller 650 is used for cooling cycle control. A device 660 can be either manually operated or PLC controlled to switch temperature control between heater 640 and chiller 650. During the heating cycle, the heater 640 heats up the heat exchange fluid (typically water) and rapidly circulates it into the mold water lines for rapid heating. After reaching a preprogrammed heating time, the device 640 shuts off the thermal supply from the heater 640 and turns on the chiller 650 to start the cooling cycle. In another embodiment (not shown), an oil TCU is used for heating cycle control, while a chiller is used for cooling the oil during the cooling cycle.

The purpose of the insulating plates 630 and 631 is to minimize the heat transfer between the compression mold and the platens. If the insulating plates were removed, the heating and cooling process would take considerably longer resulting in high haze and lower transmittance for transparent laminates.

Another processing refinement incorporates polishing the surface of compression mold to a mirror finish. To further improve optical properties, the laminate surface quality and smoothness are critical, because a non-smooth surface will scatter the light causing higher haze. The laminate surface quality is largely affected by the compression mold surface quality; all the surface defects on the mold surface will imprint onto the laminate surface. Therefore, the compression mold surface should be well polished to eliminate surface defects such as roughness and irregularity. In one aspect of present invention, the mold surface is polished to a mirror finish. In one embodiment, the mold material is aluminum; in another embodiment, the mold material is steel or stainless steel. In one embodiment, the mold is polished by hand; in another embodiment, the mold is polished by a computer controlled machining process.

The present invention laminates uni-directionally or bi-axially stretched core polymer film layers together, preferably unidirectionally stretched, where core polymer layers are used in which one or both core layer surfaces have been coated with a heat fusible polymer layer. The heat fusible layer polymers are selected so that lamination can occur at relatively low temperatures and the bonded laminate can retain a significant percentage of the mechanical properties of the stretched films, providing high quality transparent bonded laminates having excellent optical properties in transparent applications. The inventive process then fusion bonds the coated core polymer films together under heat and pressure to achieve good quality bonded laminates.

The bonded laminates have a tensile strength at least about 20% higher than the tensile strength of a monolithic sheet of polycarbonate or the same core layer polymer (fabricated by extrusion of injection molding) of equivalent thickness as measured by ASTM D-638. In particular, the bonded laminates of the present invention have a tensile strength greater than about 10,000 psi as measured by ASTM D-638. The bonded laminates have an improvement in the $V_{50}$ ballistic performance of at least about 10% in comparison to the $V_{50}$ ballistic performance of a monolithic sheet of polycarbonate or the same core layer polymer of equivalent thickness. One preferred bonded laminate possesses at least about a 25% improvement in $V_{50}$ ballistic performance compared to the $V_{50}$ performance of a comparable impact resistant article of the same thickness. Other preferred bonded laminates possesses at least about a 25% improvement in $V_{50}$ ballistic performance compared to the $V_{50}$ performance of a comparable impact-resistant article of the same areal density.

The fabricated transparent polymer laminates have relatively soft surfaces, so an application of a hard coating is required to protect the laminate surfaces from scratching and/or abrasion and/or wear. The laminate surfaces may need to be pre-treated to activate the surfaces to achieve good adhesive bonding with the hard coating resins. Preferably, the surface energy of the polymer laminate is about 10 dynes/cm greater than the surface tension of the coating solution, in order to ensure the coating solution wets the substrate surface, which is a prerequisite for achieving good adhesion. Good adhesion can also be affected by the functional groups on the laminate's surfaces and in the coating formulations.

In one embodiment of the present invention, the laminates which have low surface energy polymer skin layers including polypropylene, polyethylene, and the like, require corona treatment or other surface activation treatment to oxidize the surface in order to generate functional groups and increase surface energy. In another embodiment of the present invention, the laminates which have high surface energy polymer skin layers, such as PC, PET, PETG, nylon, TPU, polyacrylate, EVA, EMA, and the like, might not require additional surface treatment before hard coating. However, the surface treatment can be still applied to these high surface energy polymers if required.

Thermal curing and UV curing are the two typical curing methods for polymerization of hard coat resins, while E-Beam curing can also be used. The selection of curing mechanism can be determined by the softening point of the heat fusible layer in the transparent polymer laminate. UV curing is preferred for the heat fusible layer polymer that has a relatively low thermal deflection temperature as measured in accordance with ASTM D-648, which is lower than about 80° C., while thermal curing is preferred for the heat fusible layer polymer that has a thermal deflection temperature higher than about 80° C.

The hard coating formulation comprises ingredients selected from the group consisting of resins, oligomers, monomers, initiators, solvents and additives. Not all the components are necessarily included in the hard coating formulation, but minimally the coating formulation should include initiator, solvent and at least one ingredient from the hard coat resin: either oligomer or monomer. These components in coating formulation should be chemically compatible with each other. Suitable oligomers include aliphatic urethane acrylates, aromatic urethane acrylate, acrylated acrylic, allylic, amine modified acrylate, chlorinated polyester acrylate, epoxy acrylates, epoxy methacrylate, fatty acid modified acrylate, melamine acrylate, polyester acrylate, silicone acrylate, urethane methacrylate, methyl silicone, methyl or phenyl silicone, alkoxy silicone, epoxy silicone, mercapto silicone, alicyclic epoxy silicone, and the like. The functionality of the oligomers is preferably from 2 to 10. The monomers include acrylic ester, acid ester, acidic acrylate, alkyl acrylate, and the like. The functionality of the monomers is preferred from 1 to 10. The initiators include benzophenone, benzoin ethers, benzyl ketals, α-dialkoxy acetophenone, α-hydroxy-alkyl-phenone, α-aminoalkylphenone, thioxanthones, titanocene, α-hydroxyketone, phenylglyoxylate, benzyldimethyl-ketal, α-aminoketone, bis hydroxyl alkyl acetophenone, acyl phosphine oxide, metallocene, iodonium salt, diacyl peroxide, dialkyl peroxide, hydroperoxide, monoperoxycarbonate, peroxydicarbonate, peroxyester, peroxyketal, ketone peroxide, and the like. The solvent selection is well known to those of ordinary skill in the coating formulation art.

The hard coating formulation can be applied on the laminates via dip coating, spray coating, float coating, curtain coating, spin coating, blade coating, and the like. The coating process is well known to those of ordinary skill in the coating art. The curing time, radiation energy density (for UV curing) and temperature (for thermal curing) are optimized to obtain a crack-free and fully cured coating layer. The hard coated laminates can extend their service life compared to the non-coated ones. The haze increase of the hard coated laminates in present invention ideally should be less than 5%, or preferably less than 3%, or more preferably less than 1%, after 100 cycles of 500 gram Taber abrasion testing in accordance with ASTM D-1044, or 20 cycles of 2.5 lbf eraser testing in accordance with MIL-PRF-32432.

Depending on the anticipated application of the transparent laminates, compression molds are designed and manufactured to fabricate the specific articles of transparent armor. Transparent laminates of the present invention can be fabricated as protective eyewear (spectacles and goggles) and face shields, windows and vision blocks for armored vehicles, ballistic shield windows, goggles, aircraft transparencies and sensor windows, infrared domes for missiles, and laser ignition windows for medium and large caliber cannons in military applications.

Commercial applications include law enforcement vehicle windows, ballistic shields, including replacements for the ballistic shields currently employed in banks and other commercial enterprises, and executive protective armor.

The bonded laminates of the present invention can be further laminated with other polymeric and/or non-polymeric sheets or plates to further enhance impact resistance for opaque armor applications, such as vehicle or aircraft armor, or ballistic shield applications, such as ballistic panels for portable shelters. Polymeric sheet materials include polymethyl-methacrylate (PMMA), polycarbonates (PC), polyetherimides (PEI), polyethersulfones (PES), thermoplastic or thermosetting polymeric composites (such as glass or carbon fiber reinforced epoxy composites), and the like. Non-polymeric sheet materials include glass (both annealed and heat treated), ceramics and metal (such as high strength steel or aluminum), and the like.

The present invention includes impact-resistant automotive parts formed from opaque or transparent laminates of the present invention, as well as impact-resistant industrial, structural, semi-structural or decorative panels or other articles formed from the opaque or transparent laminates of the present invention.

One aspect of the invention is directed to a transparent fusion bonded polymeric film laminate consisting of core polymer film layers individually coated on at least one side with a heat fusible polymer layer, the core polymer film layers having melting or softening temperatures between about 100 and about 350° C., and the heat fusible polymer layers having melting or softening temperatures between about 65° C. to about 265° C., but which are at least 3° C. below the melting or softening temperature of the polymers of the core polymer film layers; where the core polymers are selected from the group consisting of polypropylene and polypropylene copolymers, and the heat fusible polymers are selected from the group consisting of polypropylene copolymers; or, the core polymers are selected from the group consisting of polyester polymers, such as polyethylene terephthalate (PET), and polyester copolymers, such as PET copolymers, and the heat fusible polymers are selected from the group consisting of polyester polymers, polyester copolymers, such as PET copolymers, amorphous polyesters, ethylene vinyl acetates (EVA), polymeric ionomers, ethylene-acrylic acid (EAA) copolymers, ethylene-methacrylic acid (EMA) copolymers, and polyurethanes; where the heat fusible polymer layers are thinner than the core polymer film layers, where the coated core polymer film layers are uniaxially oriented and stretched by 2× to 40×, to form stretched coated core polymer film layers having a thickness between about 5 and about 2,000 microns, where the stretched coated core polymer film layers are cross-plied or otherwise oriented to form the laminate; or at least 20% of the laminate is composed of cross-plied films that are continuously distributed in the laminate, or equally distributed in the laminate, or randomly distributed in the laminate; or the uniaxially stretched coated core polymer film layers are angle-plied to form the laminate; or at least 20% of the laminate is composed of angle-plied films that are continuously distributed in the laminate, or equally distributed in the laminate, or randomly distributed in the laminate; or the formed laminate is composed of at least two of the following components: cross-plied subunits, angle-plied subunits and arbitrarily oriented films; or the laminate is composed of subunits where at least 2 films have the same orientation, and these subunits are cross-plied; or at least 20% of the laminate is composed of cross-plied subunits that are continuously distributed in the laminate, or equally distributed in the laminate, or randomly distributed in the laminate; or the subunits are angle-plied to form the laminate; or at least 20% of the laminate is composed of angle-plied subunits that are continuously distributed in the laminate, or equally distributed in the laminate, or randomly distributed in the laminate; or the formed laminate is composed of at least two of the following components: cross-plied subunits, angle-plied subunits, and arbitrarily oriented subunits, where the laminate is heat fused at a temperature at which the laminate remains transparent, where the laminate has a tensile strength greater than about 10,000 psi as measured by ASTM D-638, in at least one direction, where the laminate is hard coated, and where the laminate is transparent, and is between 0.20 and about 10 cm thick.

In one embodiment the laminate consists of coated core polymer film layers of two or more different polymers. The layers of different coated core polymers can be alternating within the laminate, so that no two adjacent core polymer film layers consist of the same polymer. Alternatively the laminate can consist of a plurality of sub-laminates, where each sub-laminate consists of a plurality of coated core polymer film layers of the same polymer, and sub-laminates of different polymers alternate within the laminate so that no two adjacent sub-laminates consist of the same polymer. In one embodiment the laminate contain 64 to about 4000 coated core polymer film layers. In some embodiments of the laminate the melting point or softening temperature of the polymer of the heat fusible polymer layer is about 80° C. to about 200° C. Some embodiments of the laminate further contain nucleators or clarifiers, and optionally other functional additives.

Another aspect of the invention is directed to an impact-resistant article consisting of the above laminate further laminated with one or more other polymeric or non-polymeric sheets bonded by one or more adhesive layers, where the polymeric sheets are selected from the group consisting of polymethyl-methacrylate (PMMA), polyamide, polycarbonate (PC), polyetherimide (PEI), polyethersulfone (PES), thermoplastic polymeric composite and thermosetting polymeric composite sheets, and where the non-polymeric sheets are selected from the group consisting of annealed glass, heat treated glass, ceramic and metal sheets. In some embodiments the impact-resistant article is selected from an impact-resistant window, a ballistic-resistant window, vehicle body armor, an impact-resistant panel, a blast barrier, or a ballistic shield. In some embodiments the further laminated sheets are selected from the group consisting of annealed glass, heat treated glass, polymethylmethacrylate and polycarbonate sheets. Some aspects of the invention are directed to a transparent impact-resistant article formed from the above laminate, where the article can be an automotive part. In another embodiment the transparent impact-resistant article can be a polymeric laminate for ballistic protection, or is an explosive blast barrier. In some embodiments the article can be a vehicle body armor panel, a personnel armor system, or a ballistic shield. In other embodiments the transparent impact-resistant article is selected from the group consisting of protective eyewear, a face shield, a window for a combat or armored vehicle, a ballistic shield window, an aircraft transparency, a sensor window, an infrared dome for a missile, a laser ignition window for medium to large caliber cannons, a law enforcement vehicle window, and armor for executive protection.

Another aspect of the invention is directed to a method of forming transparent bonded laminates comprising applying a heat fusible polymer layer onto at least one surface of a core polymer film layer by co-extrusion, post-extrusion or solution coating to form a surface coated core layer; laminating a plurality of the surface coated core layers so that adjoining core polymer film layers have at least one heat fusible polymer layer there-between; and fusion bonding with heat and pressure the surface coated core polymer layers at a temperature at which the laminate remains transparent so that molecular diffusion and/or polymer chain entanglement occurs at heat fusible polymer layer interfaces whereby the core polymer film layers or the heat fusible polymer layers are bonded together with heat fusible polymer layers from adjacent film layers to form a transparent bonded laminate, where the heat fusible polymer layers are thinner than the core polymer film layers, the melting or softening temperature of the heat fusible polymer is at least 3° C. lower than the melting or softening temperature of the polymers of the core polymer film layers, and the coated core polymer film layers are uniaxially oriented and stretched by 2× to 40×, to form stretched coated core polymer film layers having a thickness between about 5 and about 2,000 microns, which have a tensile strength greater than about 20,000 psi as measured by ASTM D-882 in the stretched direction, where the uniaxially stretched coated core polymer film layers are cross-plied to form the laminate; or at least 20% of the laminate is composed of cross-plied films that are continuously distributes in the laminate, or equally distributes in the laminate, or randomly distributed in the laminate; or the uniaxially stretched coated core polymer film layers are angle-plied to form the laminate; or at least 20% of the laminate is composed of angle-plied films that are continuously distributed in the laminate, or equally distributed in the laminate, or randomly distributed in the laminate; or the formed laminate is composed of at least of two of the following components: cross-plied subunits, angle-plied subunits and arbitrarily oriented films; where the core polymer film layers have melting or softening temperatures between about 100 and about 350° C., where the core polymers are selected from the group consisting of polypropylene and polypropylene copolymers, and the heat fusible polymers are selected from the group consisting of polypropylene copolymers; or, the core polymers are selected from the group consisting of polyester polymers, such as polyethylene terephthalate (PET), and polyester copolymers, such as PET copolymers, and the heat fusible polymers are selected from the group consisting of polyester polymers, polyester copolymers, such as PET copolymers, amorphous polyesters, ethylene vinyl acetates (EVA), polymeric ionomers, ethylene-acrylic acid (EAA) copolymers, ethylene-methacrylic acid (EMA) copolymers, and polyurethanes, where the laminate has a tensile strength greater than about 10,000 psi as measured by ASTM D-638, in at least one direction and where the laminate is transparent, and is between 0.20 and about 10 cm thick.

In one embodiment of the method the heat fusible polymer layers are applied to both the top and bottom sides of each core polymer film layer by co-extrusion or post-extrusion. In another embodiment the surface coated core polymer film layers are uniaxially stretched following co-extrusion. In another embodiment of the method the heat fusible polymer layers are applied to each core polymer film layer by solution-coating at least one of the core polymer layers with a water-based or solvent-based solution of the polymer of the heat fusible polymer layer, or a precursor thereof. In some embodiments of the method the lamination pressure is between about 20 and about 5000 psi. In some embodiments of the method, the pressure is also maintained during the cooling cycle, between about 20 and about 5000 psi.

EXAMPLES

Testing Protocols:
Laminate Tensile Testing: Tensile test specimens were cut from the bonded laminate using a sharp-edged ASTM Type I die. The die was placed over the laminate and placed between the platens of a Wabash compression press under 755 psi of pressure to cut the laminate into ASTM Type I tensile test specimens. A Shimadzu AG-I universal test machine was used in conjunction with an Epsilon Extensometer (Model 3542-0100-100 LHT) to determine tensile properties of the bonded laminates in accordance with the ASTM D-638 method.

Film Tensile Testing: Per ASTM D-882, film samples were cut into 6"×1" strips. A film strip was firmly clamped into the grips of a Shimadzu AG-I universal test machine. The initial grip separation was 4 inches and the testing rate of 2.0 in/min was applied. 40 in/min testing was added to the tensile testing to better evaluate the material response under high strain rate for understanding the material behavior under ballistic impact.

$V_{50}$ FSP Test: The .22 caliber, 17 grains fragment simulating projectiles (FSP) were used, as specified in MIL-P-46593A. Thicker samples were tested using a .223 caliber center fired Thompson Contender rifle, while the ¼" samples were tested using a .22 caliber rim fired Savage long rifle. The standard statistical $V_{50}$ ballistic limit identifies the average velocity at which a bullet or a fragment penetrates 50% of the tested material versus non-penetration in the remaining 50% of the material tested as defined in MIL-STD-662F.

Material Properties:
Control Sample Properties—Polycarbonate
Tensile Strength of Monoclinic PC Sheets and Laminated PC Sheets It is well-known in the art that commercially available PC sheets have tensile strengths of less than 10,000 psi, as demonstrated below.

Specimen Preparation and Testing Procedures

Polycarbonate (PC) sheets were purchased from Makrolon. Both ⅛" and ¹⁄₁₆" PC tensile specimens were pressed out in the machine direction using a "dog-bone" tensile cutter in order to prepare ASTM Type II tensile specimens.

The ⅛" laminated sample was produced using the following procedure. Two ¹⁄₁₆" sheets were laminated together using thermo-plastic polyurethane film (TPU; Huntsman PE399, 0.050") as the adhesive. PC and TPU were cut into 12-inch squares and placed between two 12×12-inch plates for compression molding. Polyethylene terephthalate (PET) film was used as a release barrier between the panel and the molding plates. The compression press was heated to 235° F., and the assembled mold was placed in the compression press, making sure to center the panel on the platens. The mold was then pressed for 30 minutes at a pressure of 160 psi (11.5 Tons). Cooling was initiated after the dwell time had been achieved and the press was allowed to cool to 100° F. before the pressure was released and the mold removed. 12-inch by 12-inch panels were obtained using this method. The panels were then pressed using the "dog-bone" tensile cutter to prepare the tensile test specimens.

Testing was conducted using an MTS Insight Universal Testing Machine (Table 1). The speed at which the samples were stretched was 2.0 inches/minute.

Tensile Strength Test Results

| Specimen | Average Real Thickness (in) | Tensile Strength (psi) |
|---|---|---|
| ⅛" monoclinic PC | 0.122 | 9100 |
| ¹⁄₁₆" monoclinic PC | 0.062 | 9400 |
| ⅛" laminated PC | 0.165 | 7100 |

The tensile strength test results confirmed that both monoclinic PC sheets and the laminated PC sheet have a tensile strength of less than 10,000 psi.

Ballistic Performance of Monoclinic PC Sheets and Laminated PC Sheets

Prior art laminated sheets were prepared according to the procedure disclosed in Molari (US RE 32,406), and ballistic testing was performed using 0.22 cal 17 grain FSP in accordance with the standard protocol outlined in MIL-STD-662, as disclosed in the tables below.

Polycarbonate Specimen Preparation and Test Results

Polycarbonate (PC) sheets were laminated together using thermo-plastic polyurethane film (TPU; Huntsman PE399, 0.050") as the adhesive between layers. PC and TPU were cut into 12-inch squares and placed between two 12×12-inch plates for compression molding. Polyethylene terephthalate (PET) film was used as a release barrier between the panel and the molding plates. The compression press was heated to the desired temperature, and the mold was inserted into the press, making sure to center the panel on the platens. The mold was then pressed for the desired dwell time. Cooling was initiated after the appropriate dwell time had been achieved and the press was allowed to cool to 100° F. before the pressure was released and the mold removed. 12-inch by-12 inch panels were obtained using this method. The laminated PC panels were cut into nine 4×4-inch squares for ballistic testing. Monoclinic PC specimens for ballistic testing were cut directly from PC sheets of various nominal thicknesses.

Characteristics and Test Results of Monoclinic PC Sheets

| Nominal Thickness (in) | Aerial Density (lb/ft$^2$) | $V_{50}$ (fps) |
|---|---|---|
| ⅛ | 0.74 | 730 |
| ¼ | 1.57 | 831 |
| ⅜ | 2.38 | 1148 |
| ½ | 3.18 | 1312 |

Characteristics and Test Results of Laminated PC Panels Made of ⅛" PC Sheets

| Nominal Thickness (in) | # of ⅛" PC sheets | Average Real Thickness (in) | Aerial Density (lb/ft$^2$) | Molding Temperature (° F.) | Molding Pressure (Tons) | Molding Dwell Time (min.) | $V_{50}$ (fps) |
|---|---|---|---|---|---|---|---|
| ⅛ | 1 | .117 | 0.74 | N/A* | N/A | N/A | 730 |
| ¼ | 2 | .278 | 1.67 | 230 | 12.5 | 30 | 1055 |
| ⅜ | 3 | .440 | 2.60 | 230 | 12.5 | 45 | 1365 |
| ½ | 4 | .616 | 3.54 | 230 | 12.5 | 60 | 1546 |

*N/A = not available

Characteristics and Test Results of Laminated PC Panels Made of 1/16" PC Sheets

| Nominal Thickness (in) | # of 1/16" PC sheets | Average Real Thickness (in) | Aerial Density (lb/ft²) | Molding Temperature (° F.) | Molding Pressure (Tons) | Molding Dwell Time (min.) | $V_{50}$ (fps) |
|---|---|---|---|---|---|---|---|
| 1/8 | 2 | .165 | 0.98 | 235 | 12.5 | 20 | 793 |
| 1/4 | 4 | .373 | 2.15 | 235 | 12.5 | 30 | 1187 |
| 3/8 | 6 | .582 | 3.32 | 235 | 12.5 | 40 | 1511 |
| 1/2 | 8 | .744 | 4.48 | 235 | 12.5 | 50 | 1777 |

Effects of Drawing Ratio on UOPP Film Tensile Properties

| Draw Ratio | Tensile Strength (ksi) | Elongation At Break (%) |
|---|---|---|
| 5.0 | 40.9 | 30 |
| 5.5 | 43.7 | 25 |
| 6.0 | 57.6 | 25 |
| 7.0 | 57.7 | 22 |

The examples shown above are unidirectionally oriented polypropylene (UOPP) films that have PP homopolymer core polymer layers with PP copolymer heat fusible layers and stretched at different draw ratios. 40 in/min strain rate was applied in the testing. The results indicate that the tensile strength of UOPP films increases as the draw ratio increases, which means the high draw ratio is beneficial for obtaining higher tensile strength. Meanwhile, the break strain of UOPP films decreases as the draw ratio increases.

Effects of UOPP Film's Drawing Ratio on Tensile Properties of 0/90 Cross-Plied UOPP Laminate

| Draw Ratio | Tensile Strength (ksi) | Elongation At Break (%) |
|---|---|---|
| 6.0 | 13.6 | 46 |
| 6.25 | 14.6 | 44 |
| 6.67 | 15.8 | 38 |
| 7.08 | 16.4 | 51 |

Figure 7:
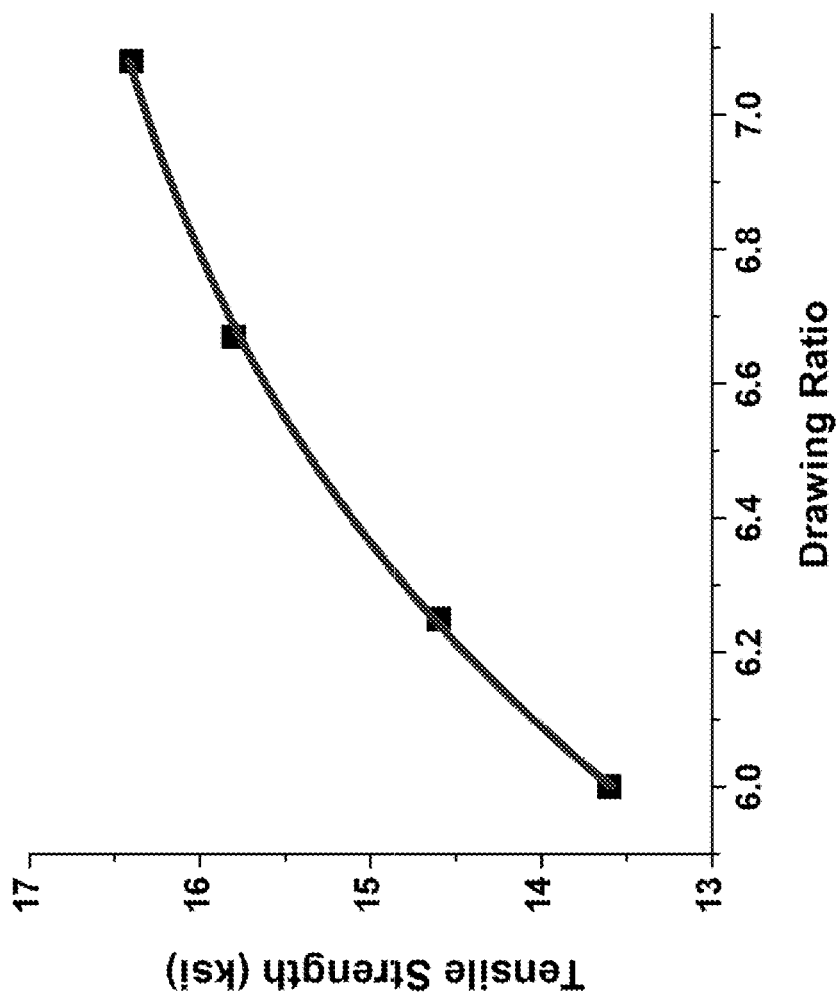
FIG. 7 displays a chart of tensile strength of UOPP laminates of the invention versus the draw ratio of the films.

The examples shown above are the UOPP films that have PP copolymer core polymer layers with PP copolymer heat fusible layers and stretched at different draw ratios. 20 sheets of 12"×12" UOPP films were cross-plied and laminated at 270° F. and 500 psi for 15 minutes. The obtained laminates were cut by a sharp-edged ASTM Type I die into tensile specimens. The samples were tested at 2 in/min strain rate. From the results, the tensile strength of UOPP laminates increases with the film draw ratio. As shown in FIG. 7, the tensile strength of UOPP laminates nonlinearly increases with the draw ratio. Even at the lowest draw ratio of 6.0×, the UOPP copolymer laminate demonstrated 49% higher tensile strength than monoclinic PC. At draw ratio of 7.08, the UOPP copolymer laminate showed 80% higher tensile strength than monoclinic PC.

Effects of Drawing Ratio on UOPP Laminate Optical Properties

1) UOPP Homopolymer Films.

| Draw Ratio | Film Haze (%) | 1/4" Laminate Haze (%) |
|---|---|---|
| 5.0 | 3.68 | 3.95 |
| 5.5 | 3.44 | 4.29 |
| 6.0 | 3.62 | 4.68 |
| 7.0 | 4.74 | 4.06 |

The examples shown above are UOPP films that have PP homopolymer core polymer layers with PP copolymer heat fusible layers, and stretched at different draw ratios. The laminates were fabricated under 280° F. and 500 psi for 20 minutes. Generally, both the haze of UOPP homopolymer films and the laminates increased when draw ratio increased.

2) UOPP Copolymer Films.

| Draw Ratio | Film Haze (%) | 1/4" Laminate Haze (%) |
|---|---|---|
| 6.00 | 3.19 | 3.59 |
| 6.25 | 3.98 | 3.21 |
| 7.08 | 3.81 | 3.06 |

The examples shown above are UOPP films that have PP copolymer core polymer layers with PP copolymer heat fusible layers, and stretched at different draw ratios. The laminates were fabricated under 273° F. and 500 psi.

Effects of Drawing Ratio on UOPP Laminate Ballistic Properties

1) UOPP Homopolymer Films

| Draw Ratio | 1/4" Laminate $V_{50}$ (ft/s) |
|---|---|
| 5.0 | 1159 |
| 5.5 | 1192 |
| 6.0 | 1278 |
| 7.0 | 1336 |

Figure 8:
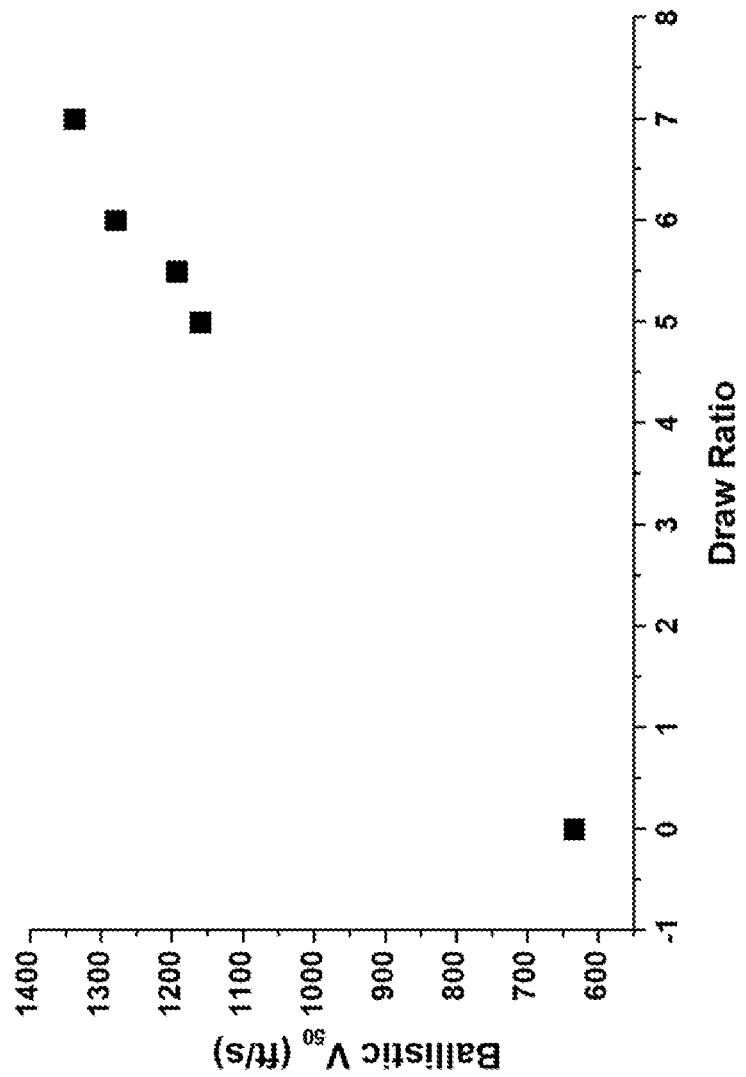
FIG. 8 displays a chart of the ballistic $V_{50}$ of UOPP laminates of the invention prepared from uniaxially stretched PP films, versus the draw ratio of the films.

The examples shown above are UOPP films that have PP homopolymer core polymer layers with PP copolymer heat fusible layers. The UOPP films were cross-plied prior to lamination. The laminates were fabricated under 280° F. and 500 psi for 20 minutes. The ballistic testing was conducted using .22 caliber 17 grains Fragment Simulated Projectiles (FSP). The ballistic $V_{50}$ of 1/4" UOPP homopolymer laminates linearly increased with film draw ratio, as shown in FIG. 8.

2) UOPP Copolymer Films.

| Draw Ratio | ¼" Laminate $V_{50}$ (ft/s) |
|---|---|
| 6.00 | 1237 |
| 6.25 | 1247 |
| 7.08 | 1294 |

The examples shown above are UOPP films that have PP copolymer core polymer layers with PP copolymer heat fusible layers. The UOPP films were cross-plied prior to lamination. The laminates were fabricated under 273° F. and 500 psi for 20 minutes. The ballistic $V_{50}$ of ¼" UOPP copolymer laminates linearly increased with film draw ratio.

Effects of Drawing Technique of PP Film—Biaxial Vs. Uniaxial Orientation

| Entry | Sample | Nominal Thickness (in) | Areal Density (lb/ft²) | $V_{50}$ (ft/s) |
|---|---|---|---|---|
| 1 | UOPP Laminate (0/90 Cross Plied) (Uniaxially Oriented PP) | 0.500 | 2.38 | 1,980 |
| 2 | BOPP Laminate (0/90 Cross Plied) (Biaxially Oriented PP) | 0.500 | 2.35 | 1,485 |
| 3 | PP Laminate (four ⅛" injection molded PP disks) | 0.500 | N/A* | 868 |
| 4 | Cast PMMA Sheet | 0.500 | 2.93 | 1,188 |
| 5 | Extruded PC Sheet | 0.500 | 3.12 | 1,312 |

*N/A = not available

As shown in the table above, orientation of the polymer films increased the ballistic performance of the laminates, and uniaxial orientation was much more effective in improving the ballistic performance versus biaxial orientation. Both of UOPP and BOPP films were cross-plied prior to lamination. The ½" thick unstretched PP showed a very low ballistic performance. By stretching biaxially, the ballistic performance of PP dramatically increased from 868 ft/s to 1,485 ft/s. Moreover, by stretching only uniaxially, the ballistic performance of the UOPP laminate further improved to 1,980 ft/s. Based on ballistic energy considerations, the ballistic performance of the BOPP laminate was 293% that of unstretched PP, while the ballistic performance of the UOPP laminate was 78% higher than that of the BOPP laminate.

More importantly, the UOPP laminate showed considerably higher ballistic $V_{50}$ than the current commercial transparent armor materials, PC and PMMA. The $V_{50}$ of UOPP laminate was 51% higher than PC, and 67% higher than PMMA, at ½" thickness.

Effect of Polymer—Biaxial Vs. Uniaxial Stretching and Orientation

| Entry | Sample | Nominal Thickness (inch) | $V_{50}$ (ft/s) |
|---|---|---|---|
| 1 | BOPET Laminate, 0/90 Cross-Plied (Biaxially Oriented PET) | 0.250 | 1,025 |
| 2 | UOPE Laminate, 0/90 Cross Plied (Uniaxially Oriented PE) | 0.250 | 1,028 |
| 3 | UOPP Laminate, 0/90 Cross-Plied (Uniaxially Oriented PP) | 0.250 | 1,320 |
| 4 | BOPP Laminate, 0/90 Cross-Plied (Biaxially Oriented PP) | 0.250 | 980 |
| 5 | Extruded PC Sheet | 0.250 | 831 |

As shown above, the effect of biaxial or uniaxial orientation on the ballistic performance enhancement of polymer laminates can also be seen not only for PP but also for a variety of other polymers, including polyethylene (PE) and polyethylene terephthalate (PET). All of BOPET, UOPE, UOPP and BOPP films were cross-plied prior to lamination. Stretched and oriented PE, PET and PP laminates, regardless of whether they were unidirectionally or biaxially drawn, showed improved ballistic resistance versus an extruded PC sheet which was produced without stretching. The data also further demonstrated that unidirectional drawing is more effective in enhancing the ballistic performance than biaxial drawing.

Effect of Lamination Orientation—Cross-Ply Vs. Non Cross-Ply Vs. Angle-Ply

Below is an example comparing ballistic resistance of 0/90 ply and 0 ply UOPP laminates, using a typical testing process to obtain $V_{50}$ for specific samples.

| | Cross-plied (0/90 degree orientation) | Aligned (0 degree orientation) |
|---|---|---|
| $V_{50}$ (ft/s) | 1268 | <706 |
| Energy @ $V_{50}$ (J) | 82 | <26 |

Cross-plied UOPP laminates, where the stretched coated PP core polymer film layers coated with a PP copolymer heat fusible polymer layer are oriented at 90 degrees to one another in adjacent layers with respect to their stretching direction, were prepared as described above. For comparison, UOPP laminates were also prepared according to the prior art, where the stretched coated core polymer film layers were aligned with respect to their stretching direction (0 degree orientation in adjacent layers).

The ¼" 0/90 ply laminates showed a $V_{50}$ of 1268 ft/s with an energy at $V_{50}$ of 82 Joules, while the ¼" 0 ply laminates (prior art laminate) had a $V_{50}$ value lower than 706 ft/s with an energy at $V_{50}$ of <26 Joules. This indicates that the 0/90 ply laminate of the present invention can absorb more than 215% higher ballistic energy versus the 0 ply laminate available using the prior art method. Thus, the presently disclosed cross-plied laminates are distinct from those obtainable from the prior art in being cross-plied, transparent and having the physical properties required for the intended use of the laminates, e.g., impact resistant eyewear, impact resistant face shields, impact resistant windows, impact resistant windshields, etc. The prior art teaches a method of producing laminates that have low ballistic impact resistance, so that those laminates cannot be used in ballistic resistance applications such as ballistic shields. The presently disclosed laminates provide a solution to the efficient fabrication of transparent, high impact resistance laminates that exhibit more than 215% higher ballistic energy absorption over those disclosed in the prior art.

Below is another example showing the film anisotropy effect in BOPP and UOPP laminates.

| | $V_{50}$ at 0 ply laminate | $V_{50}$ at 0/90 ply laminate |
|---|---|---|
| ½" UOPP Laminate | 1126 ft/s | 1980 ft/s |
| ½" BOPP Laminate | 1385 ft/s | 1485 ft/s |

As shown in the table above, different lamination orientations can significantly affect UOPP laminate ballistics, while BOPP laminates are not sensitive to lamination anisotropy because BOPP films are stretched in both the machine direction (MD) and transverse direction (TD). The UOPP laminate showed an obvious advantage over the BOPP laminate in that it has 33% higher $V_{50}$, which means that the UOPP laminate can absorb 78% more kinetic energy than the corresponding BOPP laminate under a ballistic event. UOPP laminates showed a significant difference in ballistic $V_{50}$ at different lamination anisotropy. The ballistic $V_{50}$ of 0 ply UOPP ½" laminate was 43% lower than cross-plied UOPP laminates. This result suggests that both BOPP and UOPP films are more preferred to be cross-plied in order to obtain high impact/ballistic resistance.

Below is another example showing the difference of cross-ply and angle-ply in UOPP laminates. FIG. 9 shows the different film orientations. The left laminate in FIG. 9 is a 0/90 cross-ply orientation, while the right laminate is 0/45/90/−45/90 orientation. The table below shows the ballistic $V_{50}$ results for these orientations in 0.50" UOPP laminates.

| Film Orientation | Thickness (in) | Areal Density (lb/ft²) | $V_{50}$ (ft/s) |
| --- | --- | --- | --- |
| 0 | 0.500 | 2.32 | 1,126 |
| 0/45/90/−45/0 | 0.499 | 2.34 | 1,950 |
| 0/90 | 0.508 | 2.38 | 1,980 |

Both cross-plied and angle-plied laminates showed significantly higher $V_{50}$ versus the 0 ply laminate, while the cross-plied laminate had slightly higher $V_{50}$ than the 0/45/90/−45/0 configuration. Even in this angled configuration of 0/45/90/−45/0, the films at 45 degrees and −45 degrees are still cross-plied, therefore, the ballistic $V_{50}$ of the 0/45/90/−45/0 laminate doesn't decrease too much versus cross-plied laminates. In all the film orientations, the cross-plied laminates (0/90) showed the highest ballistic resistance.

Lamination Pressure Effect on Optical Properties of UOPP and BOPP Laminates

| Lamination Pressure (psi) | Haze (%) | Transmittance (%) | Clarity (%) |
| --- | --- | --- | --- |
| 20 | 70.3 | 59 | 30.1 |
| 50 | 34.3 | 81.7 | 72.8 |
| 100 | 8.07 | 91.6 | 93.1 |
| 200 | 7.07 | 91.8 | 94.3 |
| 1000 | 5.48 | 91.9 | 94.1 |

In the prior art lamination process, only low pressure is applied to the UOPP films. The results above demonstrate that the optical properties of UOPP laminates are considerably affected by lamination pressure. The UOPP film in this example consists of polypropylene homopolymer core layers and polypropylene copolymer heat sealable layers. The UOPP films were cross-plied prior to lamination. The lamination temperature was 280° F. Lamination pressure from 20 to 1000 psi was applied during the lamination, as shown in the table above. The haze value of the ¼" laminates significantly dropped when the pressure increased from 20 to 200 psi. Then the haze value slowly decreased after 200 psi. Transmittance and clarity demonstrate the reverse numerical trend versus haze. Therefore, in order to obtain transparent laminates, the lamination pressure should be maintained at least at 200 psi.

Below is an example of ¼" BOPP laminates fabricated at different lamination pressures.

| Lamination Pressure (psi) | Haze (%) | Transmittance (%) | Clarity (%) |
| --- | --- | --- | --- |
| 20 | 9.99 | 79.6 | 97.1 |
| 50 | 5.41 | 78.9 | 98.0 |
| 100 | 5.23 | 78.5 | 98.1 |
| 200 | 4.3 | 79.2 | 98.1 |
| 1000 | 4.0 | 79.4 | 98.4 |

BOPP films in this example have homopolymer core polymer layer coated with EVA heat fusible layer. The BOPP laminates were fabricated at 280° F. for 20 minutes. The BOPP films were cross-plied prior to lamination. The results in the table above exhibit the similar trend as for UOPP laminates. Higher lamination pressure was beneficial for the optical properties of BOPP laminates, and at least 200 psi lamination pressure was preferable to achieve low haze. Compared to UOPP laminates, the lamination pressure showed less effect on the optical properties of BOPP laminates.

Lamination Pressure Effect on Ballistic Properties of UOPP and BOPP Laminates

| Lamination Pressure (psi) | $V_{50}$ of ¼" UOPP Laminates (ft/s) | $V_{50}$ of ¼" BOPP Laminates (ft/s) |
| --- | --- | --- |
| 20 | 1201 | 938 |
| 50 | 1212 | 968 |
| 100 | 1205 | 1005 |
| 200 | 1239 | 1006 |
| 1000 | 1219 | <907 |

BOPP films in this example have homopolymer core polymer layers coated with EVA heat fusible layer, while UOPP films have homopolymer core polymer layers coated with the same copolymer heat fusible layer. Both were cross-plied and laminated at 280° F. From 20 to 200 psi lamination pressure range, the ballistic $V_{50}$ of both BOPP and UOPP ¼" laminates slightly increased when lamination pressure increased.

Cooling Pressure Effect on Optical and Ballistic Properties of UOPP Laminates

| Cooling Pressure (psi) | Haze (%) | Transmittance (%) | Clarity (%) | Ballistic $V_{50}$ (ft/s) |
| --- | --- | --- | --- | --- |
| ~0 | 11.9 | 91.6 | 88.4 | 1325 |
| 20 | 11.5 | 92.4 | 89.0 | 1320 |
| 50 | 7.95 | 91.9 | 90.5 | 1331 |
| 100 | 7.38 | 92.4 | 92.5 | 1327 |
| 200 | 4.91 | 92.8 | 93.1 | 1322 |
| 500 | 4.44 | 92.9 | 93.4 | 1315 |

In the prior art method, no pressure or low pressure is applied to the laminates during the cooling cycle. The results shown above demonstrate that low cooling pressure can cause unacceptably high haze in the resultant laminates. In this example, UOPP films have homopolymer core polymer layers coated with copolymer heat fusible layers. The UOPP films were cross-plied prior to lamination. The lamination temperature was maintained at 280° F., and 500 psi of static pressure was applied during the lamination. Once the cooling cycle started, the pressure was reduced to 0, 20, 50, 100, 200 or 500 psi, respectively. The haze of ¼" UOPP laminates exponentially decreased when cooling pressure increased, while transmittance and clarity increased when cooling pressure increased. This example demonstrates the importance of cooling pressure on the optical properties of UOPP laminates. However, the ballistic $V_{50}$ properties of ¼" UOPP laminates was not affected by the cooling pressure.

Ballistic Comparison of Inventive UOPP Laminates with and without Hard Coating

The hard coated ¼" PC, amorphous nylon and TPU plates showed brittle failure upon ballistic impact, although they can demonstrate ductile failure at low velocity impact. This phenomenon is well known.

Compared to these commercial monoclinic transparent materials, a very hard coating can be applied onto the inventive UOPP laminates without causing brittle failure under ballistic impact. The results shown in the table below demonstrate that the ballistic $V_{50}$ of hard coated UOPP laminates almost retained the same value as the uncoated ones. Two groups of samples were encompassed: one group was composed of UOPP films that have PP homopolymer core polymer layers coated with PP copolymer heat fusible layers; another group was composed of UOPP films that have PP copolymer core polymer layers coated with PP copolymer heat fusible layers.

| Laminate | Nominal Thickness (in) | Hardcoated | $V_{50}$ (ft/s) | $V_{50}$ Reduced |
|---|---|---|---|---|
| UOPP Laminate, Homopolymer | 0.25 | No | 1350 | |
| UOPP Laminate, Homopolymer | 0.25 | Yes | 1287 | 4.7% |
| UOPP Laminate, Copolymer | 0.25 | No | 1178 | |
| UOPP Laminate, Copolymer | 0.25 | Yes | 1137 | 3.5% |

Ballistic Comparison of Inventive UOPP Laminates with Commercial Transparent Armor Sheets The ballistic $V_{50}$ of UOPP laminates and the commercially available transparent armor materials were compared at various thicknesses in order to demonstrate the ballistic advantage of UOPP laminates at all thicknesses. The commercial examples included PC, PMMA and PC/PMMA laminate.

As shown in FIG. 10A, PC, PMMA and PC/PMMA also showed linear dependence of $V_{50}$ with the panel thickness. In comparison, PC, PMMA and PC/PMMA laminates showed much lower $V_{50}$ versus UOPP regardless of panel thickness. Moreover, when considering the aereal density, as shown in FIG. 10B, UOPP laminates demonstrate tremendous advantages over the all thickness ranges. For example, at an areal density of 3.0 lb/ft$^2$, the $V_{50}$ of UOPP laminate is 68% higher than that of PC or PMMA.

The forgoing demonstrates the improvements in impact resistance and ballistic performance obtained by the laminates of the present invention versus the prior art laminates.

The description of the preferred embodiments presented herein should be taken as illustrating, rather than limiting, aspects of the present invention being defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A method of forming transparent bonded laminates comprising:
    applying a heat fusible polymer layer onto at least one surface of a core polymer film layer by co-extrusion, post-extrusion or solution coating to form a surface coated core layer;
    laminating a plurality of said surface coated core layers so that adjoining core polymer film layers have at least one heat fusible polymer layer there-between;
    fusion bonding with heat and pressure said surface coated core polymer layers at a temperature at which the laminate remains transparent so that molecular diffusion and/or polymer chain entanglement occurs at heat fusible polymer layer interfaces whereby the core polymer film layers or the heat fusible polymer layers are bonded together with heat fusible polymer layers from adjacent film layers to form a transparent bonded laminate; and
    cooling the laminate;
    wherein said heat fusible polymer layers are thinner than said core polymer film layers, said melting or softening temperature of said heat fusible polymer is at least about 5° C. lower than said melting or softening temperature of the polymers of said core polymer film layers, and said coated core polymer film layers are uniaxially oriented and stretched by 2× to 40×, to form stretched coated core polymer film layers having a thickness between about 5 and about 2,000 microns;
    wherein said core polymer film layers have melting or softening temperatures between about 100 and about 350° C.;
    wherein the core polymers are selected from the group consisting of polypropylene, polypropylene copolymers, and mixtures thereof, and the heat fusible polymers are selected from the group consisting of polypropylene copolymers and polyethylene copolymers; or, the core polymers are selected from the group consisting of polyester polymers, polyethylene terephthalate (PET), polyester copolymers, and PET copolymers, and mixtures of two or more thereof, and the heat fusible polymers are selected from the group consisting of polyester polymers, polyester copolymers, PET copolymers, amorphous polyesters, ethylene vinyl acetates (EVA), polymeric ionomers, ethylene-acrylic acid (EAA) copolymers, ethylene-methacrylic acid (EMA) copolymers, and polyurethanes;
    wherein said laminating and fusion bonding are performed in a compression mold which has a predesigned moldable and polished surface for a transparent impact article;
    wherein the pressure during fusion bonding is between about 400 and about 5000 psi;
    wherein the pressure during cooling is maintained between about 400 and about 5000 psi;
    so that said laminate is transparent, and is 0.2 to 1.5 cm thick with less than 2% thickness variation across the laminate,
    wherein the laminate transparency and low thickness variation are produced by laminating said core polymer film layers coated with a heat fusible polymer layer, in said compression mold having a polished surface.

2. The method of claim 1, wherein said heat fusible polymer layers are applied to both the top and bottom sides of each core polymer film layer by co-extrusion or post-extrusion.

3. The method of claim 2, wherein said surface coated core polymer film layers are uniaxially stretched following extrusion.

4. The method of claim 1, wherein said heat fusible polymer layers are applied to each core polymer film layer by solution-coating at least one of the core polymer layers with a water-based or solvent-based solution of the polymer of said heat fusible polymer layer, or a precursor thereof.

5. A transparent impact-resistant article fabricated using the method of claim 1.

6. The laminate of claim 5, composed of subunits wherein at least 2 films have the same orientation.

7. The laminate of claim 6, consisting of layers of different coated core polymers alternating within said laminate, so that no two adjacent core polymer film layers consist of the same core polymer.

8. The laminate of claim 6, consisting of a plurality of sub-laminates, wherein each sub-laminate consists of a plurality of coated core polymer film layers of the same core polymer and sub-laminates of different core polymers alternate within said laminate, so that no two adjacent sub-laminates consist of the same core polymer.

9. The laminate of claim 5, consisting of coated core polymer film layers of two or more different core polymers.

10. An impact-resistant article consisting of the laminate of claim 5, further laminated with one or more other polymeric or non-polymeric sheets bonded by one or more adhesive layers, wherein said polymeric sheets are selected from the group consisting of polymethyl-methacrylate (PMMA), polyamide, polycarbonate (PC), polyetherimide (PEI), polyethersulfone (PES), thermoplastic polymeric composite, and thermosetting polymeric composite sheets, and wherein said non-polymeric sheets are selected from the group consisting of annealed glass, heat treated glass, ceramic, and metal sheets.

11. The impact-resistant article of claim 10, wherein said article is an impact-resistant window, a ballistic-resistant window, vehicle body armor, an impact-resistant panel, a blast barrier, or a ballistic shield.

12. The impact-resistant article of claim 10, wherein said sheets are selected from the group consisting of annealed glass, heat treated glass, ceramic, and transparent plastic.

13. The impact-resistant article of claim 12 wherein said transparent plastic is selected from the group consisting of polymethylmethacrylate and polycarbonate.

14. The impact-resistant article of claim 5, wherein said article is an automotive part.

15. The impact-resistant article of claim 5, wherein said article is a polymeric laminate for ballistic protection, or is an explosive blast barrier.

16. The impact-resistant article of claim 15, wherein said article is a vehicle body armor panel, a personnel armor system, or a ballistic shield.

17. The impact-resistant article of claim 15, selected from the group consisting of protective eyewear, a face shield, a window for a combat or armored vehicle, a ballistic shield window, an aircraft transparency, a sensor window, an infrared dome for a missile, a laser ignition window for medium to large caliber cannons, a law enforcement vehicle window, and armor for executive protection.

18. The impact-resistant article of claim 15, wherein said article is hard coated.

19. The laminate of claim 5, wherein said laminate contains about 20 to about 4000 coated core polymer film layers.

20. The laminate of claim 5, wherein the melting point or softening temperature of the polymer of said heat fusible polymer layer is about 80° C. to about 200° C.

21. The laminate of claim 5, wherein the pressure during fusion bonding is between about 700 and about 3000 psi.

* * * * *